US012710763B2

(12) United States Patent
Bivans

(10) Patent No.: US 12,710,763 B2
(45) Date of Patent: Aug. 18, 2026

(54) METHOD FOR PROACTIVE SAFETY

(71) Applicant: Fort Robotics, Inc., Philadelphia, PA (US)

(72) Inventor: Nathan Bivans, Philadelphia, PA (US)

(73) Assignee: Fort Robotics, Inc., Philadelphia, PA (US)

( * ) Notice: Subject to any disclaimer, the term of this patent is extended or adjusted under 35 U.S.C. 154(b) by 0 days.

(21) Appl. No.: 19/066,887

(22) Filed: Feb. 28, 2025

(65) Prior Publication Data

US 2025/0271862 A1 Aug. 28, 2025

Related U.S. Application Data

(60) Provisional application No. 63/641,200, filed on May 1, 2024, provisional application No. 63/558,822, filed on Feb. 28, 2024.

(51) Int. Cl.

| | |
|---|---|
| ***G05D 1/622*** | (2024.01) |
| ***G05D 1/249*** | (2024.01) |
| ***G06T 7/73*** | (2017.01) |
| *B66F 9/06* | (2006.01) |
| *B66F 9/075* | (2006.01) |
| *G05B 19/418* | (2006.01) |
| *G05D 107/70* | (2024.01) |

(Continued)

(52) U.S. Cl.

CPC ............. *G05D 1/622* (2024.01); *G05D 1/249* (2024.01); *G06T 7/73* (2017.01); *B66F 9/063* (2013.01); *B66F 9/0755* (2013.01); *G05B 19/418* (2013.01); *G05B 2219/40202* (2013.01); *G05D 2107/70* (2024.01); *G05D 2109/10* (2024.01); *G05D 2111/10* (2024.01); *G06T 2207/30196* (2013.01); *G06T 2207/30232* (2013.01)

(58) Field of Classification Search

None

See application file for complete search history.

(56) References Cited

U.S. PATENT DOCUMENTS

| | | | |
|---|---|---|---|
| 2011/0138257 A1 | | 6/2011 | Zivic et al. |
| 2020/0213148 A1 | | 7/2020 | Sano et al. |

(Continued)

OTHER PUBLICATIONS

International Search Report for International Application No. PCT/US25/17895 mailed on May 1, 2025; 15 pages.

*Primary Examiner* — Peter D Nolan

*Assistant Examiner* — Michael F Whalen

(74) *Attorney, Agent, or Firm* — Run8 Patent Group, LLC; Peter Miller; Brian T. Chew

(57) ABSTRACT

A method includes: accessing message including a frame captured by a fixed sensor in an operating field; detecting an object in the frame; calculating a first position of the object, in a reference coordinate system, within the operating field; calculating a trust score for the object based on a set of characteristics of the message; accessing a second position of a machine in the reference coordinate system; defining a controlled zone, in the reference coordinate system, encompassing the second position occupied by the machine based on the trust score; in response to detecting the first position of the first object intersecting the controlled zone, generating a command that transitions the machine from a nominal operating mode to a reduced performance operating mode; and transmitting the command to the machine.

20 Claims, 4 Drawing Sheets

(51) Int. Cl.
*G05D 109/10* (2024.01)
*G05D 111/10* (2024.01)

(56) References Cited

U.S. PATENT DOCUMENTS

2022/0009103 A1* 1/2022 Buerkle ................. B25J 11/008
2022/0126451 A1* 4/2022 Hopkinson ............ B25J 9/1676
2024/0111307 A1* 4/2024 Kumagai ............... G05D 1/646

* cited by examiner

METHOD FOR PROACTIVE SAFETY

CROSS-REFERENCE TO RELATED APPLICATIONS

This application claims the benefit of U.S. Provisional Application No. 63/641,200, filed on 1 May 2024, and U.S. Provisional Application No. 63/558,822, filed on 28 Feb. 2024, each of which is incorporated in its entirety by this reference.

This Application is related to U.S. patent application Ser. No. 18/081,833, filed on 15 Dec. 2022, U.S. patent application Ser. No. 17/856,661, filed on 1 Jul. 2022, and U.S. patent application Ser. No. 16/937,299, filed on 23 Jul. 2020, each of which is incorporated in its entirety by this reference.

TECHNICAL FIELD

This invention relates generally to the field of functional safety and, more specifically, to a new and useful method for proactive safety within the field of functional safety.

DESCRIPTION OF THE EMBODIMENTS

The following description of embodiments of the invention is not intended to limit the invention to these embodiments but rather to enable a person skilled in the art to make and use this invention. Variations, configurations, implementations, example implementations, and examples described herein are optional and are not exclusive to the variations, configurations, implementations, example implementations, and examples they describe. The invention described herein can include any and all permutations of these variations, configurations, implementations, example implementations, and examples.

1. Methods

Figure 1A:
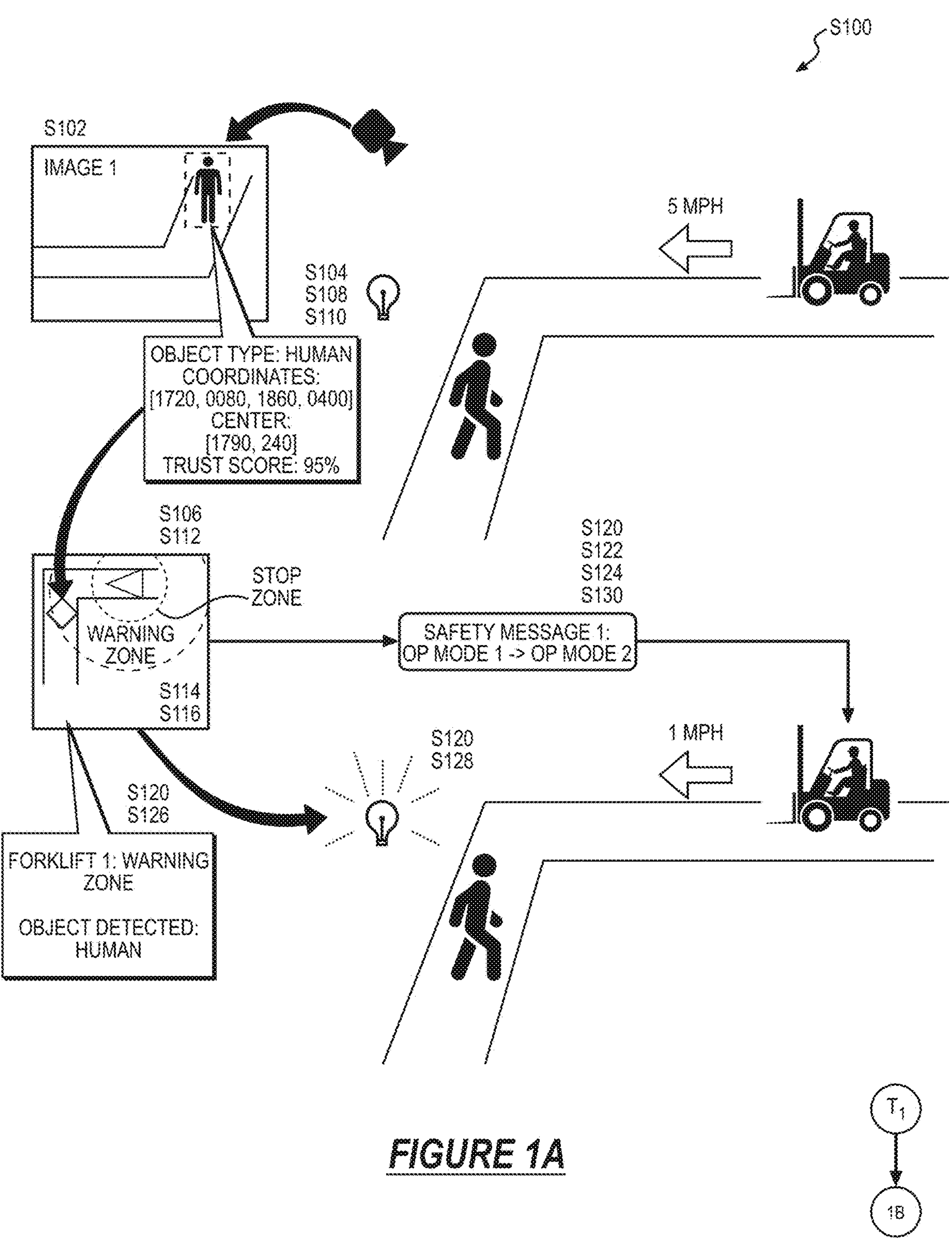
FIGS. 1A and 1B are flowchart representations of a method.
Figure 2A:
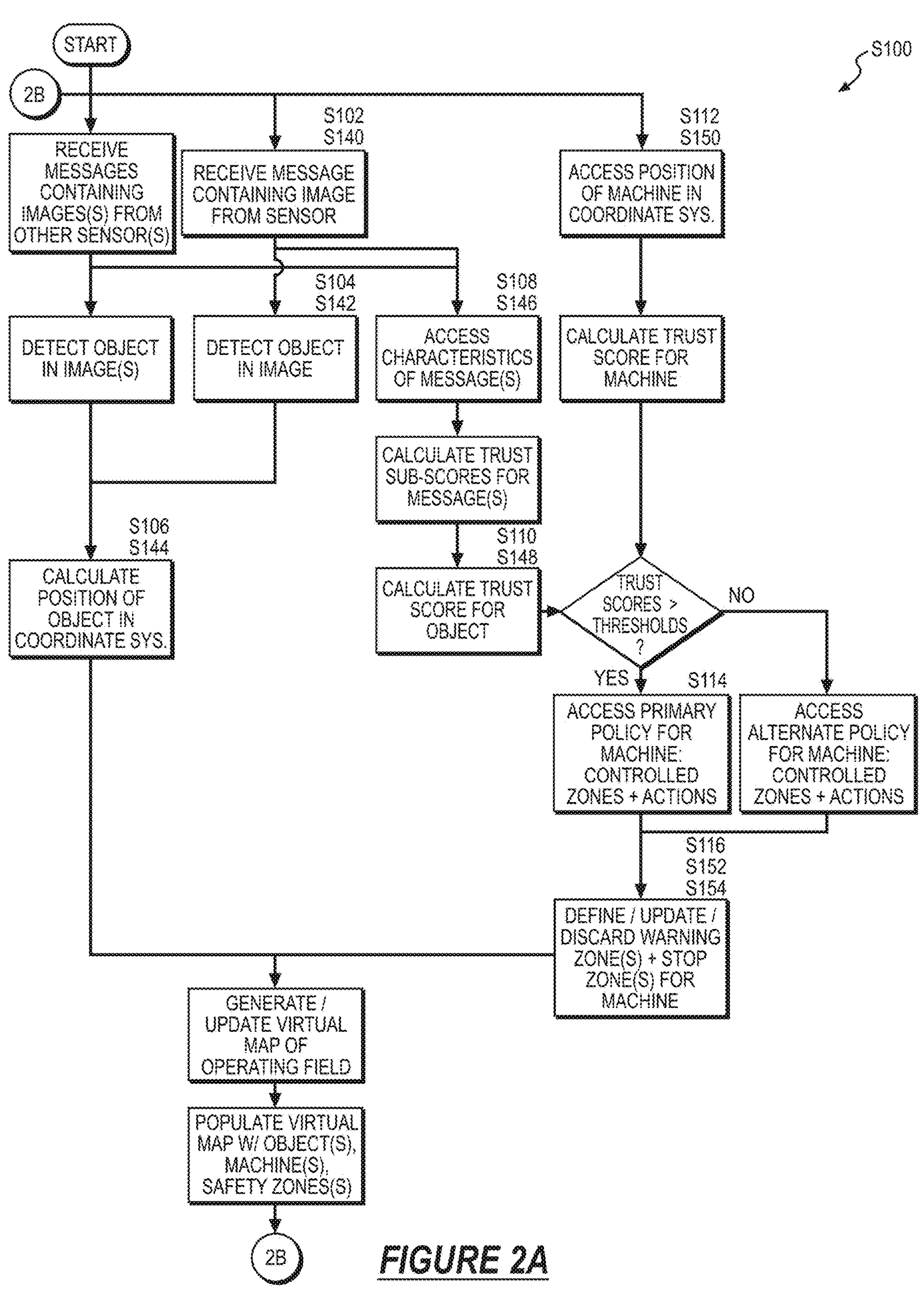
FIGS. 2A and 2B are flowchart representations of one variation of the method.
Figure 2B:
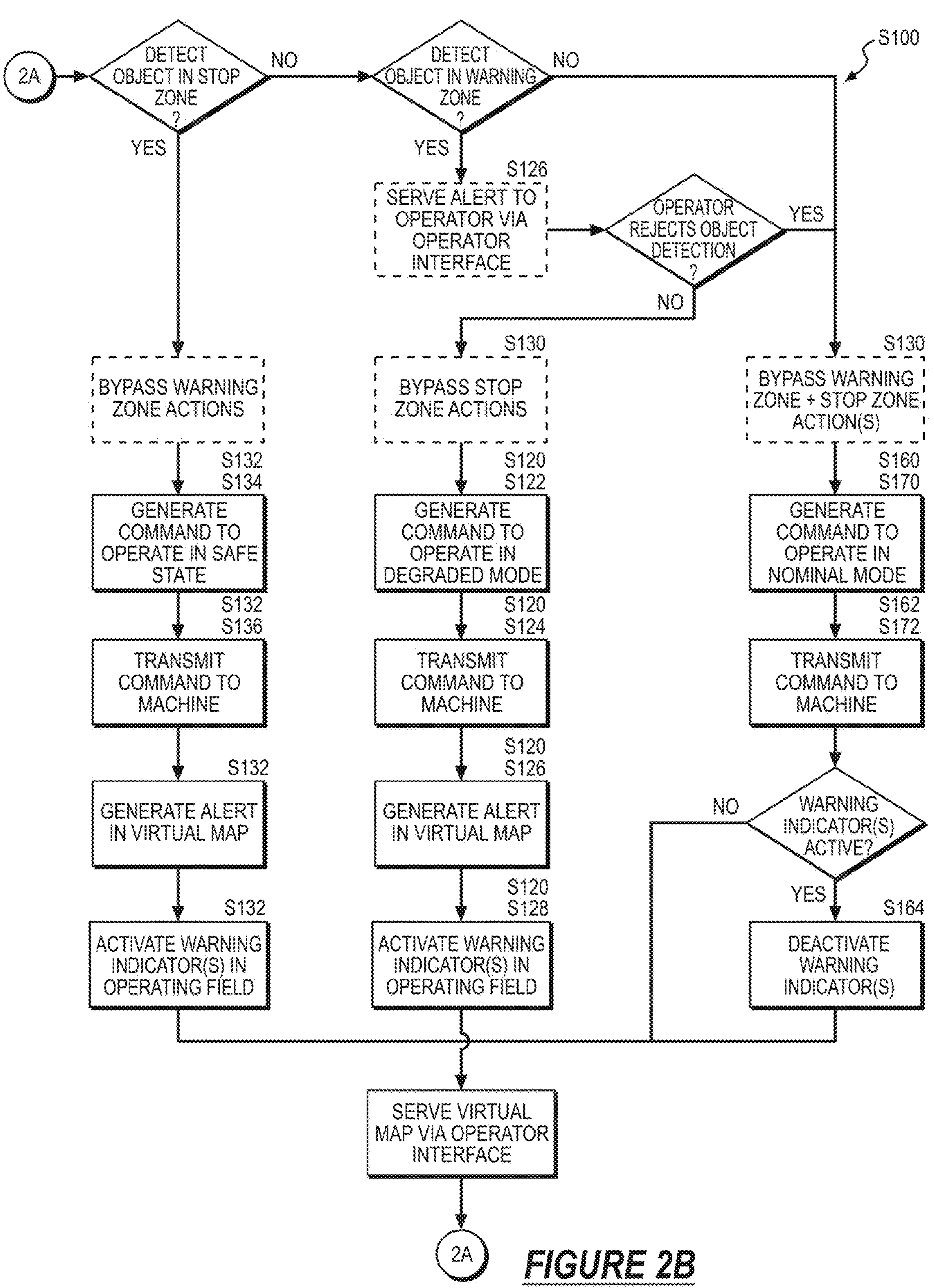

As shown in FIGS. 1A, 2A and 2B, a method S100 includes, during a first time period, accessing a first message, including a first image captured by a first fixed optical sensor defining a field of view intersecting an operating field in Block S102.

The method S100 also includes, based on a first set of features in a first region of the first image: detecting a first object in the first image in Block S104; and calculating a first position of the first object, in a reference coordinate system, within the operating field in Block S106.

The method S100 further includes accessing a first set of characteristics of the first message in Block S108. The first set of characteristics represent: a first source identifier associated with the first fixed optical sensor; and a first digital certificate assigned to the first fixed optical sensor.

The method S100 also includes: calculating a first trust score for the first object based on the first set of characteristics in Block S110; accessing a second position of a first machine in the reference coordinate system in Block S110; and, in response to detecting the first trust score exceeding a first threshold score, defining a first boundary of a first controlled zone, in the reference coordinate system, encompassing the second position occupied by the first machine in Block S116.

The method S100 further includes, in response to detecting the first position of the first object intersecting the first controlled zone, executing a first set of actions in Block S120 including: generating a first command that transitions the first machine from a nominal operating mode to a reduced performance operating mode in Block S122; and transmitting the first command to the first machine in Block S124.

1.1 Variation: Multiple Controlled Zones

As shown in FIGS. 1A, 2A and 2B, one variation of the method S100 includes, during a first time period: accessing a first message including a first image captured by a first fixed optical sensor defining a field of view intersecting an operating field in Block S102.

This variation of the method S100 also includes, based on a first set of features in a first region of the first image: detecting a first object in the first image in Block S104; and calculating a first position of the first object, in a reference coordinate system, within the operating field in Block S106.

This variation of the method S100 further includes accessing a first set of characteristics of the first message in Block S108. The first set of characteristics represent: a first network path of the first message; and a first jitter value representing a first difference between a first reception time of the first message and a first expected reception time of the first message.

This variation of the method S100 also includes: calculating a first trust score for the first object based on the first set of characteristics in Block S110; and accessing a second position of a first machine in the reference coordinate system in Block S112.

This variation of the method S100 further includes, in response to detecting the first trust score exceeding a threshold score, accessing a first policy for the first machine in Block S114. The first policy specifies: a first controlled zone including a first boundary exhibiting a first distance from the first machine; a first set of actions associated with the first controlled zone; a second controlled zone including a second boundary exhibiting a second distance from the first machine, the second distance falling below the first distance; and a second set of actions associated with the second controlled zone.

This variation of the method S100 also includes defining the first controlled zone and the second controlled zone, in the reference coordinate system, encompassing the second position occupied by the first machine in Block S116.

This variation of the method S100 further includes, in response to detecting the first position of the first object intersecting the first controlled zone, executing the first set of actions in Block S120 including: generating a first command that transitions the first machine from a nominal operating mode to a reduced performance operating mode in Block S122; transmitting the first command to the first machine in Block S124; and activating a warning indicator in the operating field proximal the first position of the first object in Block S126.

This variation of the method S100 further includes, in response to detecting the first position of the first object falling outside of the second controlled zone, bypassing the second set of actions in Block S130 including generating a second command that transitions the first machine to a safe state.

1.2 Variation: Operating Mode Change

As shown in FIGS. 1A, 2A and 2B, one variation of the method S100 includes: accessing a message including an image captured by a fixed optical sensor defining a field of view intersecting an operating field in Block S102.

This variation of the method S100 also includes, based on a set of features in a first region of the image: detecting an object in the image in Block S104; and calculating a first position of the object, in a reference coordinate system, within the operating field in Block S106.

This variation of the method S100 further includes accessing a set of characteristics of the message in Block S108. The set of characteristics represent: a digital certificate assigned to the fixed optical sensor; and a network path of the message.

This variation of the method S100 also includes: calculating a trust score for the object based on the set of characteristics in Block S110; accessing a second position of a machine in the reference coordinate system in Block S112; in response to the trust score exceeding a threshold score, defining a controlled zone, in the reference coordinate system, encompassing the second position occupied by the machine in Block S116; in response to detecting the first position of the object intersecting the controlled zone, generating a command that transitions the machine from a first operating mode to a second operating mode in Block S122; and transmitting the command to the machine in Block S124.

2. Applications

Generally, a computer system (hereinafter "the system")—including or interfacing with a machine (e.g., a robot, an autonomous forklift) and a sensor (e.g., a camera, a light detection and ranging sensor) separately deployed in an operating field (e.g., an industrial facility, a warehouse)—can execute Blocks of the method S100: to localize the machine within the operating field; to define a controlled zone in a reference coordinate system representing the operating field based on a position (or trajectory) of the machine; to access image data (e.g., a digital photograph, a depth map) generated by the sensor; to detect an object-of-interest (e.g., a human worker, an obstruction, an oil spill) within the controlled zone based on these image data; and to execute an action(s) in order to avoid an incident associated with (e.g., a collision between) the machine and the object-of-interest.

For example, in response to detecting the object-of-interest within the controlled zone, the system can execute Blocks of the method S100: to command the machine to reduce speed and/or avoid the object-of-interest; to activate a warning light and/or siren proximal the object-of-interest; and/or to alert an operator (e.g., a foreman, an analyst).

Accordingly, the system can execute Blocks of the method S100: to detect the object-of-interest in the image data generated by the sensor; to identify the object-of-interest as occupying the controlled zone of the machine, which may not detect the object-of-interest located outside of a field of view of a sensor on the machine; to command the machine to reduce speed or avoid the object-of-interest; and to warn a human worker of the safety hazard. Therefore, the system can execute Blocks of the method S100 to augment local reactive safety mechanisms of the machine with additional intelligence about the environment proximal the machine based on the image data of the sensor separately located in the operating field, thereby enabling the machine to achieve greater or more consistent productivity, detect the object-of-interest within the "blind spot" of the sensor, and avoid a potential hazard (e.g., a collision) between the machine and the object-of-interest.

2.1 Example

In one example application, during a first time period, the system executes Blocks of the method S100: to identify a first position of a first forklift in a reference coordinate system representing a warehouse, the first forklift autonomously traversing a first path (e.g., an aisle) toward a second path (e.g., a walkway) at a speed of five miles per hour; to define a controlled zone, in the reference coordinate system, proximal an intersection of the first path and the second path and encompassing the first position occupied by the first forklift (and trajectory toward the second path); to access a first image generated by a first camera located above an intersection of the first path and the second path; to detect a human worker, in the first image, located in the second path and outside of a field of view of the first forklift (e.g., obstructed by a shelf arranged along the first path); and to identify a position of the human worker, in the reference coordinate system, as occupying the controlled zone of the first forklift.

Then, the system executes Blocks of the method S100: to command the first forklift to reduce speed to one mile per hour in order to delay an arrival time of the first forklift at the intersection; and to activate a warning light and siren adjacent to the intersection in order to warn the human worker of a potential safety hazard.

In this example application, during a second time period succeeding the first time period, the system executes Blocks of the method S100: to access a second image generated by the first camera; to detect absence of the human worker from the second image and the controlled zone (e.g., due to relocation of the human worker responsive to the warning light and siren); to command the first forklift to increase speed to five miles per hour in order to resume nominal operation; and to deactivate the warning light and siren.

Therefore, the system executes Blocks of the method S100: to detect the human worker occupying the controlled zone while within a "blind spot" of a sensor mounted on the first forklift; to reduce speed of the first forklift and warn the human worker in order to avoid a safety incident; and to resume nominal operation of the first forklift responsive to absence of the human worker from the controlled zone, thereby reducing occurrence of emergency stoppage of the first forklift in order to increase productivity while maintaining safety standards.

2.2 Trust-Based Controlled Zones and Responses

More specifically, the system executes Blocks of the method S100 to receive a message of a data stream containing the image data generated by the sensor. Based on features in the image data, the system executes Blocks of the method S100: to detect objects-of-interest in the image data; and to calculate positions of the objects-of-interest in the reference coordinate system representing the operating field.

Additionally, the system executes Blocks of the method S100: to detect characteristics of the message, such as a source identifier of the sensor, a digital certificate assigned to the sensor, a network path of the message, a transmission latency of the message, etc.; to validate these characteristics according to a profile defining a target configuration for messages in the data stream; and to calculate a trust score(s)

for the message and/or the positions of the objects-of-interest in the reference coordinate system based on validation of these characteristics.

The system then executes Blocks of the method S100: to select a policy—corresponding to the trust score(s)—for a controlled zone for a machine deployed in the operating field, the policy specifying dimensions of the controlled zone and actions (e.g., safety-critical actions) executed responsive to detection of an object-of-interest intersecting with the controlled zone; to define the controlled zone, in the reference coordinate system, encompassing a position occupied by the machine; and to trigger execution of these actions in response to detecting the object-of-interest intersecting the controlled zone.

Accordingly, the system can execute Blocks of the method S100: to characterize a current (e.g., real-time) level trust in the image data communicated from the sensor; and to selectively implement policies—that trigger safety-critical actions—based on the current level of trust.

Therefore, when the current level of trust in image data communicated from the sensor falls below a predefined threshold(s), the system can: increase a size of the controlled zone in order to increase an amount of time that an operator or worker is warned of a potential hazard; and/or limit (or reduce) actions that are executed responsive to detection of an object-of-interest intersecting the controlled zone, thereby reducing impact of a security breach and/or reducing loss of productivity due to "false positive" object detections.

2.3 Variation: Security Module Object Detection and Response

As described herein, the zone controller executes the method S100: to access an image captured by a sensor arranged in an operating field; to detect an object-of-interest in the image; to calculate a position of the object-of-interest in a reference coordinate system representing the operating field; to define a controlled zone, in the reference coordinate system, encompassing a position occupied by a machine; to detect the object-of-interest intersecting the controlled zone; to generate a command that transitions the machine to a reduced performance operating mode; and to transmit the command to a security module associated with (e.g., coupled to) the machine.

However, the security module can similarly execute Blocks of the method S100: to access the image captured by the sensor; to detect the object-of-interest in the image; to calculate the position of the object-of-interest in the reference coordinate system; to define the controlled zone, in the reference coordinate system, encompassing the position occupied by the machine; to detect the object-of-interest intersecting the controlled zone; to generate the command that transitions the machine to a reduced performance operating mode; and to transmit the command to the machine.

2.4 Variation: Mobile Sensors

As described herein, the zone controller executes the method S100: to access an image captured by a fixed optical sensor arranged in an operating field; to detect an object-of-interest in the image; and to calculate a position of the object-of-interest in a reference coordinate system representing the operating field.

However, the zone controller can similarly execute Blocks of the method S100: to access an image captured by a mobile sensor, such as a light detection and ranging (or "LIDAR") sensor mounted on a first robot traversing the operating field; to detect the object-of-interest in the image; to calculate the position of the object-of-interest in the reference coordinate system; to define the controlled zone, in the reference coordinate system, encompassing the position occupied by a target machine, such as a second robot; to detect the object-of-interest intersecting the controlled zone; to generate the command that transitions the target machine to a reduced performance operating mode; and to transmit the command to the target machine.

Additionally or alternatively, for example, the first robot can similarly execute Blocks of the method S100: to access the image captured by the mobile sensor; to detect the object-of-interest in the image; to calculate a position of the object-of-interest in a reference coordinate system representing the operating field; and to communicate the position of the object-of-interest to the zone controller.

In this example, the zone controller can then execute Blocks of the method S100: to define the controlled zone, in the reference coordinate system, encompassing the position occupied by a target machine; to detect the position of the object-of-interest—as communicated by the first robot—intersecting the controlled zone; to generate the command that transitions the second robot to a reduced performance operating mode; and to transmit the command to the second robot.

Therefore, a network of robots deployed in the operating field can execute Blocks of the method S100: to detect objects-of-interest in images captured by sensors on these robots; to calculate positions of these objects-of-interest in the reference coordinate system; and to communicate these positions to the zone controller (and/or among these robots) in order to further augment the system with additional intelligence about the environment.

3. System

Generally, the system can include (or interface with): a set of sensors (e.g., cameras, optical sensors); a set of machines (e.g., autonomous forklifts, robots); and a zone controller. The zone controller can be communicatively coupled to the set of the machines and the set of sensors, such as via a communication network (e.g., a local area network, a wide area network, the Internet).

In one implementation, the system includes the set of machines deployed within an operating field—such as an industrial facility or warehouse—including a set of paths (e.g., aisles, walkways).

In one example, the system includes a first subset of machines, in the set of machines, traversing paths in the set of paths during an operating period.

In another example, the system includes a second subset of machines, in the set of machines, operating adjacent to paths in the set of paths during the operating period.

In this implementation, the system includes the set of sensors arranged within the operating field.

In one example, the system includes fixed optical sensors arranged at (e.g., fixed above) corners or intersections of the set of paths.

3.1 Sensors

Generally, a sensor can include a device that generates and/or outputs data to a destination, such as the zone controller and/or a machine. The zone controller and/or the machine can execute an action(s) based on the data (or absence of data).

For example, the sensor can include a light detection and ranging (hereinafter "LIDAR") sensor, a radar sensor, an ultrasonic sensor, a color camera, an infrared camera, etc.

In one implementation, a sensor generates data (e.g., an image, a frame) representative of objects in a field of view of the sensor.

In one example, the sensor includes a LIDAR sensor that outputs a depth map (or "frame")—such as in the form of a point cloud representing distances between the LIDAR sensor and external surfaces within the field of view of the LIDAR sensor—per scan cycle of the LIDAR sensor.

In another example, the sensor includes a color camera that outputs a color map (or "frame"), such as in the form of a digital photographic image or a video feed of digital photographic images at a rate of 20 Hz.

3.1.1 Sensor Localization

In one implementation, the system includes: a first sensor arranged at a first location (e.g., a first fixed location above a first intersection of a first subset of paths in the set of paths) in the operating field; and a second sensor arranged at a second location (e.g., a second fixed location above a second intersection of a second subset of paths in the set of paths) in the operating field.

In this implementation, the system accesses position information representing: a first position—corresponding to the first location—and/or a first orientation of the first sensor relative to the coordinate system representing the operating field; and a second position, corresponding to the second location, and/or a second orientation of the second sensor relative to the coordinate system.

The system repeats the foregoing methods and techniques for each sensor in the set of sensors to access position information representing a position and/or an orientation of the sensor relative to the coordinate system representing the operating field.

3.2 Machines

In one implementation, the system includes the set of machines deployed in the operating field.

For example, a machine can include a robot, a vehicle (e.g., an autonomous vehicle, a semi-autonomous vehicle), a forklift, a conveyer belt, a high-speed door, a control system, and/or an industrial system (e.g., manufacturing system, farming system, construction system, power system, transportation system), etc.

3.2.1 Security Modules

In one implementation, the system includes a set of security modules. Each security module corresponds to a machine in the set of machines. For example, a security module can: be mounted on a corresponding machine in the set of machines; and execute safety critical diagnostics and control functions for the corresponding machine.

More specifically, the security module can include a safety subsystem configured to execute functional safety operations, such as generating commands that cause a corresponding machine (or a group of machines) to transition from a first operating mode (e.g., a nominal operating mode) to a second operating mode (e.g., a reduced performance operating mode, a safe state), input validation, command validation, system health monitoring, communication integrity encapsulation, and/or output control, such as described in U.S. patent application Ser. No. 16/937,299, U.S. patent application Ser. No. 17/856,661, and U.S. patent application Ser. No. 18/081,833.

3.3 Zone Controller

Generally, the system can include a zone controller, such as described in U.S. patent application Ser. No. 17/856,661.

In one implementation, the zone controller: receives data from the set of sensors; and executes functional safety operations based on these data.

In one example, the zone controller: receives a set of data from a first sensor; detects a violation of a safety policy associated with a first machine based on the set of data; generates a message (e.g., a safety message) including a command to transition the first machine into a safe state; and transmits the message to a first security module corresponding to the first machine, such as described in U.S. patent application Ser. No. 18/081,833.

In this example, in response to receiving the message including the command: the first security module transmits the command to the first machine; and the first machine transitions to the safe state in response to the command.

In another example, the zone controller: receives a set of data from a first sensor; detects a violation of a safety policy based on the set of data; generates a message including the set of data; and transmits the message to a first security module corresponding to the first machine.

In this example, in response to receiving the message including the set of data, the first security module: detects a violation of a safety policy based on the set of data; generates a command that transitions the first machine into a safe state; and transmits the command to the first machine. The first machine transitions into the safe state in response to the command.

4. Proactive Safety

Generally, as shown in FIGS. 1A, 2A and 2B, the system can access a message containing an image generated by a sensor (e.g., a fixed optical sensor) defining a field of view intersecting the operating field. Based on a set of features in a region of the image, the system can: detect an object-of-interest in the image; and calculate a first position of the object-of-interest relative to a reference coordinate system (e.g., a three-dimensional coordinate system, a two-dimensional coordinate system) representing the operating field. The system can: define a controlled zone within the coordinate system based on a second position of a machine deployed in the operating field; and execute an action(s) in response to the first position of the object-of-interest falling within (or intersecting) the controlled zone, such as transmitting a command to the machine to operate according to a reduced performance operating mode (e.g., reduced speed, reduced functionality), activating a warning light or siren arranged in the operating field proximal the first position, etc.

Accordingly, the system can: access image data generated by a set of sensors arranged throughout an operating field; based on these image data, detect an object-of-interest, such as a human worker, within a controlled zone of an autonomous machine deployed in the operating field, the object-of-interest positioned outside of a field of view of—and not detected by—onboard sensors of the autonomous machine; and execute actions to warn the human worker and to reduce speed of the autonomous machine in order to avoid a collision. Therefore, the system can augment the onboard sensors of the autonomous machine with additional intelligence about the environment proximal the autonomous machine, thereby enabling the autonomous machine to increase productivity, detect objects within "blind spots" of the onboard sensors, and reduce occurrence of collisions.

4.1 Object Detection and Localization

Block S102 of the method S100 recites accessing a first message including a first image captured by a first fixed optical sensor defining a field of view intersecting an operating field.

The method S100 includes, based on a first set of features in a first region of the first image: detecting a first object in the first image in Block S104; and calculating a first position of the first object, in a reference coordinate system, within the operating field in Block S106.

Generally, in Blocks S102, S104, and S106, the system can: access an image captured by a sensor arranged in the operating field; detect an object-of-interest within the frame; and calculate a position of the object-of-interest, in a reference coordinate system, within the operating field.

In one implementation, in Block S102, the system accesses a first message including a first image generated by a first sensor arranged in the operating field.

In another implementation, in Block S104, the system detects a first object in the first image based on a first set of features in a first region of the first image.

In one example, the system accesses the first image including a first set of pixel values (e.g., distance values, color values) representing a first set of surfaces relative to a field of view of the first sensor.

In this example, the system correlates a first cluster of pixel values—in the first set of pixel values—with a first object (e.g., an object-of-interest), such as based on an object detection model.

In particular, the system: correlates the first cluster of pixel values with the first object characterized by an object type (e.g., an object-of-interest, a human, a forklift, a pallet of product); and calculates a confidence score associated with the object type for the first object.

In this example, the system: extracts a first set of features based on the first set of pixel values; detects the first object—characterized by an object type—based on the set of features; and calculates a confidence score associated with the object type for the first object. More specifically, the system can implement computer vision techniques (e.g., edge detection, object recognition, template matching, machine learning algorithms) to extract the set of features representing the first object from the first frame and assign the object type to the first object based on the first set of features.

In another implementation, in Block S106, the system calculates a position of the first object, in the reference coordinate system, within the operating field.

For example, the system can generate position information specifying a first set of coordinates representing boundaries (or a "bounding box") of the first object within the first image and/or a center (e.g., a centroid) of the first object within the first image.

In this example, based on a known position and orientation of the first sensor relative to the reference coordinate system, the system can correlate a first position of the first object—relative to the first image—with a second position of the first object relative to the reference coordinate system representing the operating field.

More specifically, the system can correlate the first set of coordinates—representing boundaries of the first object within the first image—with a second set of coordinates within the reference coordinate system based on the known position and orientation of the first sensor in the coordinate system. In this example, the second set of coordinates represents the second position of the first object relative to the reference coordinate system.

The system can repeat the foregoing methods and techniques: to detect additional objects within the first image; to identify positions of these objects relative to the first frame; and to localize these objects within the reference coordinate system representing the operating field.

The system can repeat the foregoing methods and techniques for each image captured by each sensor in the set of sensors during a target time interval.

Therefore, the system can localize a set of objects within the operating field (e.g., within the three-dimensional coordinate system representing the operating field) during a target time interval.

4.1.1 Communication

In one implementation, the first sensor: accesses (or captures) a first image in a first data stream; generates a first message including the first image; and transmits the first message to the zone controller.

In response to receiving the first message from the first sensor, the zone controller accesses the first image in the first message. Based on a first set of features in a first region of the first image, the zone controller: detects a first object in the first image; and calculates a position of the first object, in the reference coordinate system, within the operating field.

For example, the zone controller can: detect the first object in the first image by correlating the first set of features with the first object; generate a first set of position information representing a first position of the first object relative to the first image; and calculate a second set of position information—representing the second position of the first object relative to the reference coordinate system representing the operating field—based on the first set of position information.

In one variation, the first sensor: accesses (or generates) the first image; detects a first object in the first image by correlating a first set of features—in the first image—with the first object; and generates a first set of position information representing a first position of the first object relative to the first image.

In this variation, the first sensor: generates a first message including the first image and/or the first set of position information; and transmits the first message to the zone controller.

In response to receiving the first message from the first sensor, the zone controller calculates a second set of position information—representing the second position of the first object relative to the reference coordinate system representing the operating field—based on the first set of position information.

In one implementation, the first sensor accesses a first configuration for the first data stream.

For example, the first sensor can access a profile defining the first configuration for each message containing data from the first data stream, such as a message format, error correction code (e.g., cyclic redundancy check (hereinafter "CRC"), cryptographic hash function, parity bit(s)), an encoding scheme, a periodicity specification, a latency specification, a source authentication specification, and/or an encryption specification, etc.

In this implementation, the first sensor generates the first message according to the first configuration.

For example, the transmitter module can: access the first configuration—defining a source authentication specification, a network path specification, an encryption specification, an error code correction specification, a periodicity specification, and a latency specification—for the first data stream; and generate the first message according to the first configuration.

In this example, the first sensor can generate the first message including: source authentication information (e.g., a source identifier associated with the first sensor, a digital signature); encryption session information (e.g., encryption key, encryption seed); the first image of the first data stream; a timing reference (e.g., a timestamp), a first CRC value; etc.

Accordingly, the system can communicate messages according to a configuration of a data stream, thereby maintaining security and/or integrity of the data stream and the entire system while communicating this data stream across an untrusted communication network.

4.1.2 Trust Scores

The method S100 includes: accessing a first set of characteristics of the first message in Block S108; and calculating a first trust score for the first object based on the first set of characteristics in Block S110.

Generally, in Blocks S102, S104, S106, S108, and S110, the system can: receive a message containing an image captured by a sensor; detect an object-of-interest in the image; calculate a position of the object-of-interest, in a reference coordinate system, within an operating field; and calculate a trust score for the object (e.g., for the position of the object) based on characteristics of the message.

In one implementation, in response to receiving the first message from the first sensor, the zone controller accesses a first set of characteristics of the first message in Block S108.

More specifically, the zone controller can access (or detect, calculate) the first set of characteristics representing: a first source identifier associated with the first sensor; a first digital certificate assigned to the first sensor; a first network path of the first message; a first transmission latency of the first message, the first transmission latency representing a transmission time (or timestamp) of the first message from the first sensor and a reception time of the first message at the zone controller; and a first jitter value representing a difference between the reception time of the first message at the zone controller and an expected reception time (e.g., according to a schedule, according to a target period of messages in the first data stream) of the second message at the controller.

In another implementation, in Block S110, the zone controller calculates a first trust score for the first object based on the first set of characteristics.

More specifically, the zone controller can: calculate a first set of trust sub-scores based on the first set of characteristics; and calculate the first trust score for the first object based on the first set of trust sub-scores (e.g., based on a formula defined in the profile defining the first configuration for the first data stream, based on an average of the first set of trust sub-scores), such as described in U.S. patent application Ser. No. 18/081,833.

Additionally or alternatively, the zone controller can execute the foregoing methods and techniques to calculate a confidence score associated with an object type for the first object. The zone controller can then calculate the first trust score for the first object based on the confidence score.

The system zone controller can repeat the foregoing methods and techniques to calculate a trust score for each object detected in the reference coordinate system representing the operating field.

4.1.2.1 Source Authentication and Scoring

In one implementation, the zone controller accesses the first source identifier associated with the first source identifier and included in the first message.

In response to detecting presence of the first source identifier in a communication authorization list that specifies authorized identifiers of entities (e.g., sensors, machines), the zone controller calculates a first trust sub-score (e.g., 100%)—in the first set of trust sub-scores—for the first message.

Alternatively, in response to detecting absence of the first source identifier from the communication authorization list, the zone controller calculates a second trust sub-score (e.g., 0%, 25%, 50%)—in the first set of trust sub-scores—for the first message.

4.1.2.2 Digital Certificate Verification and Scoring

In another implementation, the zone controller: receives the first message during a first time period; and accesses a first digital certificate—assigned to the first sensor—defining a first validity period (e.g., one day, one week, one year).

In this implementation, at a first time in the first time period, the zone controller detects the first time falling within the first validity period. In response to detecting the first time falling within the first validity period, the zone controller: detects the first digital certificate as valid; and calculates a first trust sub-score (e.g., 100%)—in the first set of trust sub-scores—for the first message.

Alternatively, the zone controller can detect the first time falling outside of the first validity period. In response to detecting the first time falling outside of the first validity period, the zone controller: detects the first digital certificate as invalid (or expired); and calculates a second trust sub-score (e.g., 0%, 25%, 50%)—in the first set of trust sub-scores—for the first message.

In another implementation, the zone controller accesses the first digital certificate—assigned to the first sensor—defining a first certificate authority.

In this implementation, in response to detecting presence of the first certificate authority in a list of trusted certificate authorities, the zone controller calculates a first trust sub-score (e.g., 100%)—in the first set of trust sub-scores—for the first message.

Alternatively, in response to detecting absence of the first certificate authority in the list of trusted certificate authorities, the zone controller: calculates a second trust sub-score (e.g., 0%, 25%, 50%)—in the first set of trust sub-scores—for the first message.

4.1.2.3 Network Path Validation and Scoring

In one implementation, the zone controller accesses (or detects) a first network path of the first message, the first network path including a first set of nodes (or hops).

More specifically, the zone controller can detect a first set of node identifiers of the first set of nodes representing the first network path.

In this implementation, in response to detecting presence of the first set of node identifiers in an authorized list of node identifiers, the zone controller calculates a first trust sub-score (e.g., 100%)—in the first set of trust sub-scores—for the first message.

Alternatively, in response to detecting absence of a node identifier(s), in the first set of node identifiers, in the authorized list of node identifiers, the zone controller calculates a second trust sub-score (e.g., 0%, 25%, 50%)—in the first set of trust sub-scores—for the first message.

4.1.2.4 Latency Validation and Scoring

In another implementation, the zone controller accesses (or calculates) a transmission latency of the first message.

For example, the zone controller can: receive the first message—including a timing reference (e.g., a timestamp)—at a reception time; and calculate a transmission latency of the first message based on a difference between the reception time and the timing reference (and a synchronization offset between the first sensor and the zone controller).

In this implementation, in response to detecting the transmission latency falling below a threshold latency (e.g., ten milliseconds, 100 milliseconds), the zone controller calculates a first trust sub-score (e.g., 100%)—in the first set of trust sub-scores—for the first message.

Alternatively, in response to detecting the transmission latency exceeding the threshold latency, the zone controller calculates a second trust sub-score (e.g., 0%, 25%, 50%)—in the first set of trust sub-scores—for the first message.

In one variation, the zone controller accesses a mapping defining: a first trust sub-score (e.g., 100%) for a message based on a detected transmission latency for the message falling within a first range (e.g., 0-10 milliseconds); a second trust sub-score (e.g., 50%) based on a detected transmission latency for the message falling within a second range (e.g., 10-100 milliseconds); and a third trust sub-score (e.g., 0%) based on a detected transmission latency for the message falling within a third range (e.g., exceeding 100 milliseconds).

In this variation, the zone controller: detects a transmission latency of the first message falling within a range in the mapping; and calculates a trust sub-score—corresponding to the range—for the first message based on the mapping.

For example, the zone controller can: detect a transmission latency of 50 milliseconds for the first message; and calculate the second trust sub-score (e.g., 50%)—in the first set of trust sub-scores—for the first message in response to detecting the transmission latency falling within the second range in the mapping.

4.1.2.5 Periodicity Validation and Scoring

In one implementation, the zone controller accesses (or calculates) a jitter value of the first message, the jitter value representing a difference between a reception time of the first message at the zone controller and an expected reception time of the first message at the zone controller.

In one example, the zone controller: receives the first message at a second reception time; accesses a first reception time of a preceding message received at the zone controller; accesses a target period for messages in the first data stream; and calculates an expected reception time of the first message based on a sum of the first reception time and the target period.

In this example, the zone controller calculates a jitter value of the first message based on a difference between the second reception time and the expected reception time.

In another example, the zone controller accesses a schedule defining a set of expected reception times for messages in the first data stream. The schedule defines an expected reception time—in the set of expected reception times—for each message in the first data stream.

In this example, the zone controller: receives the first message at a reception time; accesses an expected reception time of the first message from the schedule; and calculates a jitter value of the first message based on a difference between the reception time and the expected reception time.

In this implementation, in response to detecting the jitter value falling below a threshold jitter value (e.g., five milliseconds, 25 milliseconds), calculating a first trust sub-score (e.g., 100%)—in the first set of trust sub-scores—for the first message.

Alternatively, in response to detecting the jitter value exceeding the threshold jitter value, calculating a second trust sub-score (e.g., 0%, 25%, 50%)—in the first set of trust sub-scores—for the first message.

In one variation, the zone controller accesses a mapping defining: a first trust sub-score (e.g., 100%) for a message based on a detected jitter value for the message falling within a first range (e.g., 0-40 milliseconds); a second trust sub-score (e.g., 50%) based on a detected jitter value for the message falling within a second range (e.g., 40-100 milliseconds); and a third trust sub-score (e.g., 0%) based on a detected jitter value for the message falling within a third range (e.g., exceeding 100 milliseconds).

In this variation, the zone controller: detects (or calculates) a jitter value of the first message falling within a range in the mapping; and calculates a trust sub-score—corresponding to the range—for the first message based on the mapping.

For example, the zone controller can: calculate a jitter value of 15 milliseconds for the first message; and calculate the first trust sub-score (e.g., 100%)—in the first set of trust sub-scores—for the first message in response to detecting the jitter value falling within the first range in the mapping.

4.1.3 Multiple Sensors

Generally, the system can: access a subset of images generated by a subset of sensors in the operating field; detect the first object in the subset of images; and calculate a position of the object, in the reference coordinate system, within the operating field based on the subset of images.

For example, the system can: generate sets of position information representing positions of the first object relative to the subset of images; and calculate the position of the first object relative to the reference coordinate system based on the sets of position information and positions of the subset of sensors in the reference coordinate system.

In one implementation, the system executes the foregoing methods and techniques: to access a first message including a first image captured by a first sensor arranged at a first fixed location in the operating field, the first image including a first set of pixel values representing positions of a first set of surfaces relative to a first field of view of the first sensor; to detect a first object in the first image based on the first set of pixel values, the first object characterized by a first object type; to calculate a first confidence score associated with the first object type for the first object in the first image; and to generate a first set of position information representing a first position of the first object relative to the first image.

For example, the system can execute the foregoing methods and techniques to generate the first set of position information representing a first set of coordinates representing boundaries (or a "bounding box") of the first object within the first image and/or a center (e.g., a centroid) of the first object within the first image.

In this implementation, the system repeats the foregoing methods and techniques: to access a second message including a second image captured by a second sensor arranged at a second fixed location in the operating field, the second image including a second set of pixel values representing positions of a second set of surfaces relative to a second field of view of the second sensor; to detect the first object in the second image based on the second set of pixel values; to calculate a second confidence score associated with the first object type for the first object in the second image; and to generate a second set of position information representing a second position of the first object relative to the second image.

For example, the system can execute the foregoing methods and techniques to generate the second set of position information representing a second set of coordinates representing boundaries (or a "bounding box") of the first object within the second image and/or a center (e.g., a centroid) of the first object within the second image.

In another implementation, the system: accesses a third position of the first sensor in the reference coordinate system; accesses a fourth position of the second sensor in the reference coordinate system; and calculates a fifth position of the first object relative to the reference coordinate system based on the first set of position information representing the first position of the first object relative to the first image, the second set of position information representing the second position of the first object relative to the second image, the third position of the first sensor in the reference coordinate system, and the fourth position of the second sensor in the reference coordinate system.

More specifically, based on known positions and orientations of the first sensor and the second sensor relative to the reference coordinate system, the system can correlate the first position of the first object relative to the first image—and the second position of the first object relative to the second image—with the fifth position of the first object relative to the reference coordinate system representing the operating field.

In particular, the system can correlate the first set of coordinates representing boundaries of the first object within the first image—and the second set of coordinates representing boundaries of the first object within the second image—with a third set of coordinates within the reference coordinate system based on the known positions and orientations of the first sensor and the second sensor in the reference coordinate system.

In one example, the system: correlates the first set of coordinates with a fourth set of coordinates within the reference coordinate system based on a known position and orientation of the first sensor in the reference coordinate system; correlates the second set of coordinates with a fifth set of coordinates within the reference coordinate system based on a known position and orientation of the second sensor in the reference coordinate system; and calculates the third set of coordinates based on an average of the fourth set of coordinates and the fifth set of coordinates.

In another example, the system: correlates the first set of coordinates with a fourth set of coordinates within the reference coordinate system based on a known position and orientation of the first sensor in the reference coordinate system; calculates a first confidence score for the fourth set of coordinates; correlates the second set of coordinates with a fifth set of coordinates within the reference coordinate system based on a known position and orientation of the second sensor in the reference coordinate system; calculates a second confidence score for the fifth set of coordinates; and calculates the third set of coordinates based on a weighted average of the fourth set of coordinates according to the first confidence score and the fifth set of coordinates according to the second confidence score.

In this example, the system calculates a composite confidence score based on correspondence (e.g., similarity) between the fourth set of coordinates and the fifth set of coordinates, the first confidence score for the fourth set of coordinates, and/or the fifth confidence score for the fifth set of coordinates.

More specifically, the system can calculate the composite confidence score inversely proportional to a standard deviation of the fourth set of coordinates and the fifth set of coordinates.

In these examples, the third set of coordinates represents the second position of the first object relative to the reference coordinate system.

In one variation, the system executes the foregoing methods and techniques: to access a first message including a first image captured by a first fixed optical sensor defining a first field of view intersecting the operating field; to detect a first object in the first image based on a first set of features in a first region of the first image; to calculate a first confidence score for the first object based on the first image; to access a first set of characteristics of the first message; and to calculate a first set of trust sub-scores for the first message based on the first set of characteristics.

In this variation, the system repeats the foregoing methods and techniques: to access a second message including a second image captured by a second fixed optical sensor defining a second field of view intersecting the operating field; to detect the first object in the second image based on a second set of features in a second region of the second image; to calculate a second confidence score for the first object based on the second image; to access a second set of characteristics of the second message; and to calculate a second set of trust sub-scores for the second message based on the second set of characteristics. For example, the second set of characteristics of the second message can represent: a second source identifier associated with the second fixed optical sensor; and a second digital certificate assigned to the second fixed optical sensor.

Based on the first set of features—in the first region of the first image—and the second set of features in the second region of the second image, the system executes the foregoing methods and techniques to calculate a first position of the first object, in the reference coordinate system, within the operating field.

In this variation, the system calculates a first trust score for the first object based on: the first set of trust sub-scores for the first message; the second set of trust sub-scores for the second message; the first confidence score; and/or the second confidence score.

In one example, the system calculates the first trust score for the first object based on an average of the first set of trust sub-scores for the first message and the second set of trust sub-scores for the second message.

In another example, the system: calculates a first set of weighted trust sub-scores based on a product of the first set of trust sub-scores and the first confidence score; calculates a second set of weighted trust sub-scores based on a product of the second set of trust sub-scores and the second confidence score; and calculates the first trust score of the first object based on an average of the first set of weighted trust sub-scores and the second set of weighted trust sub-scores.

4.2 Machine Localization

Block S112 of the method S100 recites accessing a second position of a first machine in the reference coordinate system.

Generally, in Block S112, the system can localize a machine in the reference coordinate system representing the operating field.

In one implementation, the system accesses a position of a first machine within the reference coordinate system.

In one example, the system (e.g., the zone controller) executes the foregoing methods and techniques to access a message including an image captured by a sensor defining a field of view intersecting the operating field. Based on a set of features in a region of the image, the system executes the foregoing methods and techniques: to detect a first machine in the image; and to calculate a second position of the first machine, in the reference coordinate system, within the operating field.

In another example, the first machine: generates a set of position information representing a position of the first machine within the reference coordinate system (e.g., based on an inertial measurement unit in the first machine); generates a second message including the set of position information; and transmits the second message to the zone controller.

More specifically, a first security module associated with the first machine can: generate the second message indicating the second position of the first machine in the reference coordinate system; and transmit the second message to the zone controller.

In response to receiving the second message, the zone controller detects the position of the first machine within the reference coordinate system based on the set of position information in the second message.

In these examples, the system executes the foregoing methods and techniques: to access a first set of characteristics of the first message; to calculate a first set of trust sub-scores for the first message; to access a second set of characteristics (e.g., a second certificate assigned to the first security module) of the second message; and/or to calculate a second set of trust sub-scores for the second message.

The system can execute the foregoing methods and techniques to calculate a trust score for the machine based on the first set of trust sub-scores for the first message and/or the second set of trust sub-scores for the second message.

The system can repeat the foregoing methods and techniques for each machine in the set of machines in order to localize the set of machines within the operating field (e.g., within the reference coordinate system representing the operating field) during the target time interval.

4.3 Controlled Zones

Generally, in Block S114, the system can access a policy (or a set of policies) specifying a set of controlled zones for a machine.

In one implementation, the system accesses a first policy specifying a first controlled zone (e.g., a "warning" zone) characterized by a first set of dimensions and/or a first set of distances from a machine. For example, the system can access the first policy specifying the first controlled zone including: a first boundary (e.g., an outer boundary) including a first point (or points) exhibiting a first distance of ten feet from a position (e.g., a current position, a boundary box, a center or a centroid) of the machine; and a second boundary (e.g., an inner boundary) including a second point (or points) exhibiting a second distance of five feet from the position of the machine.

In this implementation, the system accesses the first policy specifying a first set of actions associated with the first controlled zone. More specifically, the system can access the first policy specifying the first set of actions responsive to detection of an object within (or intersecting) the first controlled zone.

For example, the system can access the first policy specifying the first set of actions including: generating a command that transitions the machine from a first operating mode (e.g., a nominal operating mode) to a second operating mode (e.g., a reduced performance operating mode); transmitting the command to the machine; serving a warning alert to an operator; and/or activating a warning light or siren in the operating field; etc.

In another implementation, the system accesses the first policy specifying a second controlled zone (e.g., a "stop" zone) characterized by a second set of dimensions and/or a second set of distances from the machine. For example, the system can access the first policy specifying the second controlled zone including a boundary (e.g., an outer boundary) including a point (or points) exhibiting a distance of two feet from a position (e.g., a current position, a boundary box, a center or a centroid) of the machine.

In this implementation, the system accesses the first policy specifying a second set of actions associated with the second controlled zone. More specifically, the system can access the first policy specifying the second set of actions responsive to detection of an object within (or intersecting) the second controlled zone.

For example, the system can access the first policy specifying the second set of actions including: generating a command that transitions the machine to a safe state (e.g., emergency stop, power down); transmitting the command to the machine; serving a critical alert to an operator; and/or activating a warning light or siren in the operating field; etc.

The system can access the first policy specifying: an additional controlled zone(s) characterized by a set of dimensions and/or a set of distances from the machine; and a set of actions associated with the additional controlled zone responsive to detection of an object within (or intersecting) the additional controlled zone.

The system can access a policy specifying a particular controlled zone (e.g., dimensions, distance from machine) and a particular set of actions based on a machine type—and/or an object type—associated with the policy.

4.3.1 Trust-Based Policy Selection

Block S114 of the method S100 recites, in response to detecting the first trust score exceeding a threshold score, accessing a first policy for the first machine, the first policy specifying: a first controlled zone including a first boundary exhibiting a first distance from the first machine; a first set of actions associated with the first controlled zone; a second controlled zone including a second boundary exhibiting a second distance from the first machine, the second distance falling below the first distance; and a second set of actions associated with the second controlled zone.

In one implementation, the system accesses a set of policies for the first machine. The set of policies include a first policy and a second policy.

For example, the first policy specifies: a first controlled zone (e.g., a first "warning" zone) including a first boundary (e.g., a first outer boundary) including a first point (or points) exhibiting a first distance from the first machine; a first set of actions associated with the first controlled zone; a second controlled zone (a first "stop" zone) including a second boundary (e.g., a second outer boundary) including a second point (or points) exhibiting a second distance—from the first machine—falling below the first distance; and a second set of actions associated with the second controlled zone.

The first set of actions include: generating a first command that transitions the first machine from a nominal operating mode to a reduced performance operating mode; transmitting the first command to the first machine; serving a warning alert to an operator; and/or activating a warning light or siren in the operating field; etc.

The second set of actions include: generating a second command that transitions the first machine to a safe state (e.g., emergency stop, power down); transmitting the second command to the first machine; serving a critical alert to an operator; and/or activating a warning light or siren in the operating field; etc.

In this example, the second policy specifies: a third controlled zone (e.g., a second "warning" zone) including a third boundary (e.g., a third outer boundary) including a third point (or points) exhibiting a third distance—from the first machine—exceeding the first distance; a third set of actions associated with the third controlled zone; a fourth controlled zone (a second "stop" zone) including a fourth boundary (e.g., a fourth outer boundary) including a fourth point (or points) exhibiting a fourth distance—from the first machine—exceeding the second distance and falling below the third distance; and a fourth set of actions associated with the fourth controlled zone.

The third set of actions include: serving a warning alert to an operator; and/or activating a warning light or siren in the operating field; etc. More specifically, the third set of actions can exclude: generating the first command that transitions the first machine from the nominal operating mode to the reduced performance operating mode; and transmitting the first command to the first machine.

The fourth set of actions include: generating the first command that transitions the first machine from the nominal operating mode to the reduced performance operating mode; transmitting the first command to the first machine; serving a critical alert to an operator; and/or activating a warning light or siren in the operating field; etc. More specifically, the fourth set of actions can exclude: generating the second command that transitions the first machine to the safe state; and transmitting the second command to the first machine.

In this implementation, the system executes the foregoing techniques: to calculate a first trust score for a first object detected in the reference coordinate system; and to calculate a second trust score for the first machine.

In this implementation, the system accesses (or selects) the first policy in response to: the first trust score for the first object exceeding a first threshold score (e.g., 80%, 90%); trust scores—for other objects detected in the reference coordinate system—exceeding the first threshold score; and/or the second trust score for the first machine exceeding a second threshold score (e.g., 80%, 90%).

Alternatively, the system can access (or select) the second policy in response to: the first trust score for the first object falling below the first threshold score; another trust score—for another object detected in the reference coordinate system—falling below the first threshold score; and/or the second trust score for the first machine falling below the second threshold score.

Accordingly, the system can: characterize a current (e.g., real-time) level of trust in data communicated from sensors and machines deployed in the operating field; and selectively implement policies—that trigger safety-critical actions—based on the current level of trust.

Therefore, when the current level of trust in data communicated from sensors and machines deployed in the operating field falls below a predefined threshold(s), the system can: increase sizes of controlled zones in order to increase an amount of time that an operator or worker is warned of a potential hazard; and/or limit (or reduce) actions that are executed responsive to detection of an object intersecting a controlled zone, thereby reducing impact of a security breach and/or reducing loss of productivity due to "false positive" object detections.

4.3.2 Controlled Zone Localization

Block S116 of the method S100 recites, in response to detecting the first trust score exceeding a first threshold score, defining a first boundary of a first controlled zone, in the reference coordinate system, encompassing the second position occupied by the first machine.

Generally, in Block S116, the system can define a controlled zone within the reference coordinate system based on a current position of a machine within the reference coordinate system.

In one implementation, in response to accessing a position of a first machine within the reference coordinate system, the system (e.g., the zone controller) defines a first controlled zone, in the reference coordinate system, encompassing the position occupied by the machine.

In one example, in response to a set of trust scores—for a set of objects detected in the operating field—exceeding a first threshold score and/or a trust score for the first machine exceeding a second threshold score, the system: accesses the first policy specifying the first controlled zone (e.g., the "warning" zone) characterized by the first set of dimensions and/or the first set of distances; identifies a first position occupied by the first machine within the reference coordinate system; and defines the first controlled zone, in the reference coordinate system, encompassing the first position occupied by the first machine.

In this example, the system defines the first controlled zone including: a first boundary (e.g., an outer boundary) including a first point (or points) exhibiting a first distance of ten feet from the first position occupied by the first machine; and a second boundary (e.g., an inner boundary) including a second point (or points) exhibiting a second distance of five feet from the first position occupied by the first machine.

More specifically, the system can define the first controlled zone characterized by a first set of coordinates within the coordinate system representing the first boundary and the second boundary.

The system can define additional controlled zones—proximal the first machine—within the reference coordinate system according to the first policy.

For example, the system: accesses the first policy specifying the second controlled zone (e.g., the "stop" zone) characterized by the second set of dimensions and/or the second set of distances; and defines the second controlled zone, in the reference coordinate system, encompassing the first position occupied by the first machine.

In this example, the system defines the second controlled zone including: a third boundary (e.g., an outer boundary) including a third point (or points) exhibiting a third distance of two feet from the first position occupied by the first machine.

More specifically, the system can define the second controlled zone characterized by a second set of coordinates within the coordinate system representing the third boundary.

4.3.3 Additional Machines

The system can repeat the foregoing methods and techniques to define a "warning" zone and/or a "stop" zone—in the reference coordinate system—for each machine in the set of machines.

For example, the system can execute the foregoing methods and techniques to access a second policy for a second machine in the set of machines, the second policy specifying: a third controlled zone including a fourth boundary (e.g., an outer boundary) including a fourth point (or points) exhibiting a fourth distance from the second machine (e.g., the fourth distance exceeding the first distance specified by the first policy) and a fifth boundary (e.g., an inner boundary) including a fifth point (or points) exhibiting a fifth distance from the second machine (e.g., the fifth distance exceeding the second distance specified by the first policy); a third set of actions associated with the third controlled zone; a fourth controlled zone including a sixth boundary (e.g., an outer boundary) including a sixth point (or points) exhibiting a sixth distance from the second machine (e.g., the sixth distance falling below the fourth distance and exceeding the third distance specified by the first policy); and a fourth set of actions associated with the fourth controlled zone.

In this example, in response to the set of trust scores—for the set of objects detected in the operating field—exceeding the first threshold score and/or the trust score for the second machine exceeding the second threshold score, the system can execute the foregoing methods and techniques: to access a position of a second machine in the reference coordinate system; and to define the third controlled zone and the fourth controlled zone, in the reference coordinate system, encompassing the position occupied by the second machine.

4.3.4 Virtual Map

In another implementation, the system (e.g., the zone controller): accesses a digital floor plan (e.g., a two-dimensional or three-dimensional engineering plan) of the operating field; and inserts (near) real-time information representing positions of machines, controlled zones, and/or objects within the operating field into a graphical representation of the floor plan to create a "virtual map" representing the current state of the operating field, the set of machines, and a set of objects detected within the operating field.

The system can transmit the virtual map to an operator via an operator interface.

4.4 Controlled Zone Violation

The method S100 includes, in response to detecting the first position of the first object intersecting the first controlled zone, executing a first set of actions—in Block S120—including: generating a first command that transitions the first machine from a nominal operating mode to a reduced performance operating mode in Block S122; and transmitting the first command to the first machine in Block S124.

Generally, in Blocks S120, S122, S124, S126, and S128, the system can: detect an object within a controlled zone specified by a policy; and execute a set of actions associated with the policy.

In one implementation, during a first time period, the system detects a first position of a first object—relative to the reference coordinate system—intersecting (or falling within) a first controlled zone (e.g., a "warning" zone) encompassing a second position occupied by a first machine.

In response to the first position of the first object intersecting the first controlled zone, the system executes a first set of actions associated with the first controlled zone in Block S120.

More specifically, the system (e.g., the zone controller) can execute the first set of actions including: generating a first message including a first command that transitions the first machine from a first operating mode (e.g., a nominal operating mode) to a second operating mode (e.g., a reduced performance operating mode) in Block S122; and transmitting the first message to the first machine in Block S124. The first machine transitions from the first operating mode to the second operating mode responsive to the first command. For example, the first machine transitions from the nominal operating mode (e.g., a first maximum speed of five miles per hour) to the reduced performance operating mode (e.g., a second maximum speed of one mile per hour).

Additionally or alternatively, the system can generate the first message including a first set of coordinates representing the first position of the first object relative to the reference coordinate system; and transmit the first message to the first machine. In response to receiving the first message, the first machine can calculate a path based on the first set of coordinates representing the first position of the first object in order to avoid the first object.

In one variation, the zone controller: generates a first message including a first command that transitions the first machine from a first operating mode (e.g., a nominal operating mode) to a second operating mode (e.g., a reduced performance operating mode); and transmits the first message to a first security module coupled to the first machine.

More specifically, the zone controller can generate the first message including: a first bit pattern (e.g., "10100111") representing the first command according to a first encoding scheme; and a second bit pattern (e.g., "01011000") representing the first command according to a second encoding scheme. The second bit pattern can exhibit a hamming distance exceeding (or corresponding to) a threshold (or minimum) hamming distance (e.g., two, four, eight) from the first bit pattern.

In this variation, the first security module: receives the first message from the zone controller; and validates the first message.

For example, the first security module can validate the first message by verifying that the first message includes the first bit pattern and the second bit pattern representing the first command.

In response to validating the first command, the first security module transmits the first command (or a different command) to the first machine. The first machine transitions from the nominal operating mode to the reduced performance operating mode responsive to the first command (or the different command).

Alternatively, in response to detecting a bit pattern—excluded from the first encoding scheme and the second encoding scheme—in the first message, the first security module can trigger the first machine to transition to a safe state.

Additionally, in response to the first position of the first object intersecting the first controlled zone, the system can execute actions in a first set of actions associated with the first controlled zone, such as: serving a warning alert—indicating the first object intersecting the first controlled zone—to an operator (e.g., via an operator interface, via the virtual map) in Block S126; and/or activating a warning indicator (e.g., a warning light, a warning siren) in the operating field proximal the first position of the first object in Block S128; etc.

For example, the system can generate (or update) a virtual map of the operating field representing: the first position of the first object relative to the reference coordinate system representing the operating field; the known position of the first sensor in the reference coordinate system; and the second position of the first machine in the reference coordinate system.

In this example, the system can: populate the virtual map with a representation of the first controlled zone; label the representation of the first controlled zone with an alert indicating detection of the first object intersecting the first controlled zone; and serve the virtual map to the operator via the operator interface.

In another implementation, during the first time period, the system detects the first position of the first object falling outside of a second controlled zone (e.g., a "stop" zone) encompassing the first position occupied by the first machine. In response to the first position of the first object falling outside of the first controlled zone, the system bypasses a second set of actions associated with the second controlled zone in Block S130, such as by generating a second command that transitions the first machine to a safe state (e.g., emergency stop, disengage power, disconnect fuel supply).

Accordingly, by executing the first set of actions in response to detecting the first object intersecting the first controlled zone, the system can reduce speed of the first machine and warn a human worker of a (potential) safety hazard, thereby enabling the human worker to remediate the safety hazard (e.g., remove the first object from the first controlled zone) while avoiding an emergency stop of the first machine. Therefore, the system can reduce downtime of the first machine during operation.

4.5 Additional Responses

In one implementation, the system executes the foregoing methods and techniques to generate a third controlled zone (e.g., a second "warning" zone) and a fourth controlled zone (e.g., a second "stop" zone) encompassing a third position occupied by a second machine in the operating field.

In this implementation, in response to detecting the first position of the first object intersecting (or falling within) the third controlled zone encompassing the third position occupied by the second machine, the system executes a third set of actions associated with the third controlled zone.

In one example, the system (e.g., the zone controller) executes the third set of actions including: generating a second message including a first command that transitions the second machine from a first operating mode (e.g., a nominal operating mode) to a second operating mode (e.g., a reduced performance operating mode); and transmitting the second message to the second machine (e.g., to a security module coupled to the second machine). The second machine transitions from the first operating mode to the second operating mode responsive to the first command.

In another example, the zone controller: generates a second message including a first command that transitions the second machine from a first operating mode (e.g., a nominal operating mode) to a second operating mode (e.g., a reduced performance operating mode); and transmits the second message to a second security module coupled to the second machine.

In this example, the second security module: receives the second message from the zone controller; validates the first command in the second message; and transmits the first command (or a different command) to the second machine in response to validating the first command. The second machine transitions from the nominal operating mode to the reduced performance operating mode responsive to the first command (or the different command). The second machine transitions from the first operating mode to the second operating mode responsive to the first command.

Additionally, in response to the first position of the first object intersecting the third controlled zone, the system can execute the third set of actions including serving a warning alert—indicating the first object intersecting the third controlled zone—to an operator (e.g., via an operator interface, via the virtual map), etc.

Alternatively, in response to detecting the first position of the first object intersecting (or falling within) the fourth controlled zone encompassing the third position occupied by the second machine, the system executes a fourth set of actions associated with the fourth controlled zone.

For example, the system (e.g., the zone controller) can execute the fourth set of actions including: generating a third message including a second command that transitions the second machine to a safe state (e.g., from a nominal operating mode to the safe state, from a reduced performance operating mode to the safe state); and transmitting the third message to the second machine (e.g., to a security module coupled to the second machine). The second machine transitions from the first operating mode to the second operating mode responsive to the first command.

Additionally, in response to the first position of the first object intersecting the fourth controlled zone, the system can execute the fourth set of actions including serving a warning alert—indicating the first object intersecting the fourth controlled zone—to an operator (e.g., via an operator interface, via the virtual map), etc.

4.6 Resumption

Figure 1B:
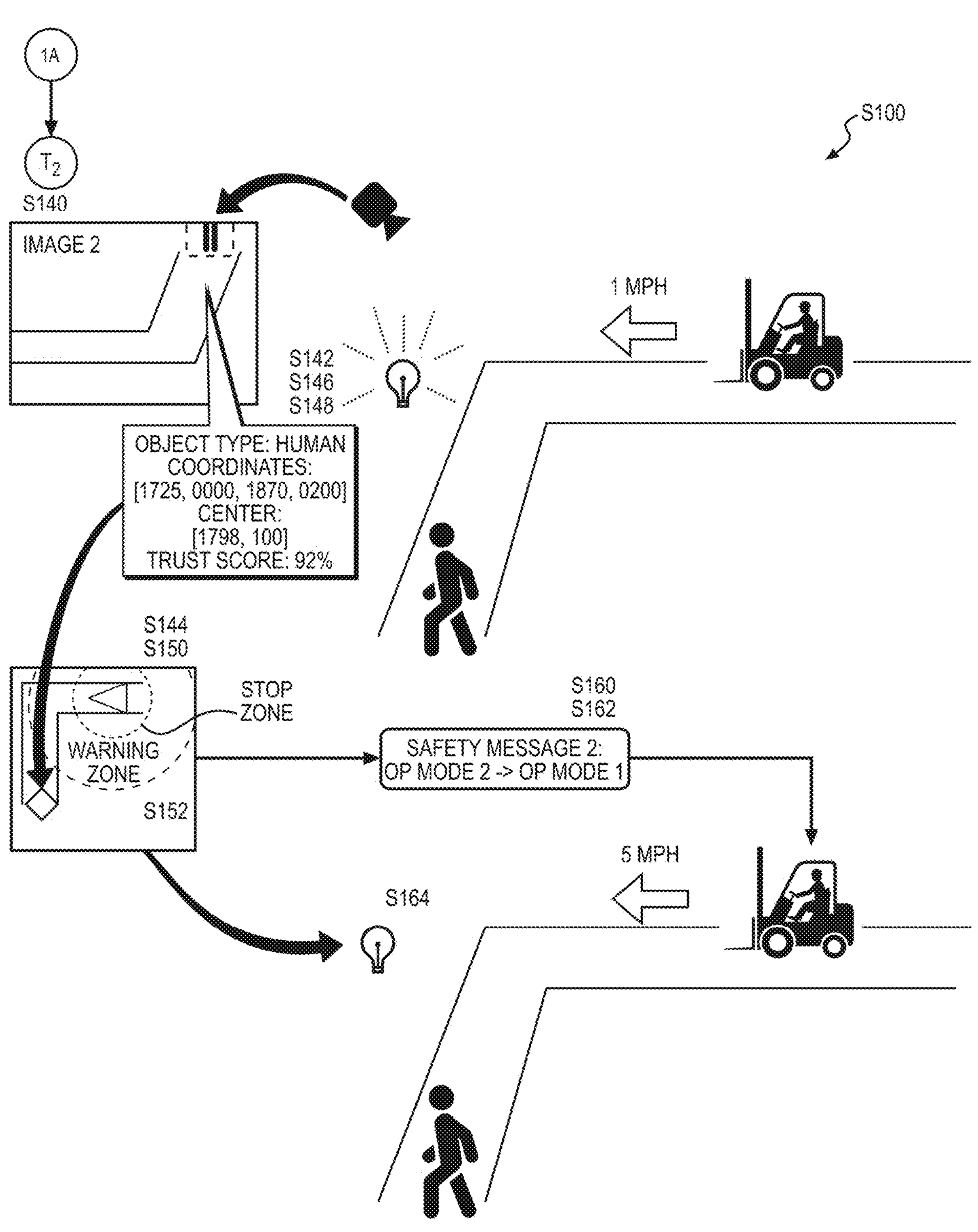

Generally, as shown in FIG. 1B, the system can restore a machine to a nominal operating mode in response to detecting absence of an object in a controlled zone encompassing a position of the machine.

In one implementation, during a first time period, the system executes the foregoing methods and techniques to access a first message including a first frame captured by a first sensor. Based on a first set of features in a first region of the first image, the system executes the foregoing methods and techniques: to detect the first object in the first image; to calculate a first position of the first object, in the reference coordinate system, within the operating field; to access a first set of characteristics of the first message; to calculate a first trust score of the first object based on the first set of characteristics; to access a second position of a first machine in the reference coordinate system; and, in response to detecting the first trust score exceeding a threshold score, to define a first controlled zone (e.g., a "warning" zone) and a second controlled zone (e.g., a "stop" zone) encompassing the second position occupied by the first machine.

For example, the first set of characteristics of the first message can represent: a first source identifier associated with the first sensor; a first digital certificate assigned to the first sensor; a first network path of the first message; a first transmission latency of the first message; and/or a first jitter value representing a difference between a first reception time of the first message and a first expected reception time of the first message; etc.

In this implementation, the system executes the foregoing methods and techniques: to detect the first position of the first object intersecting the first controlled zone; to generate a first command that transitions the first machine from a nominal operating mode to a reduced performance operating mode; to transmit the first command to the first machine; and to activate a warning indicator proximal the first position of the first object. The first machine transitions from the nominal operating mode to the reduced performance operating mode responsive to the first command.

In this implementation, during a second time period succeeding the first time period, the system executes the foregoing methods and techniques to access a second message including a second image captured by the first sensor in Block S140. Based on a second set of features in a second region of the second image, the system executes the foregoing methods and techniques: to detect the first object in the second image in Block S142; to calculate a third position of the first object, in the reference coordinate system, within the operating field in Block S144; to access a second set of characteristics of the second message in Block S146; to calculate a second trust score of the first object based on the second set of characteristics in Block S148; to access a fourth position of a first machine in the reference coordinate system in Block S150; and, in response to detecting the second trust score exceeding the threshold score, to update (or define) the first controlled zone and the second controlled zone encompassing the fourth position occupied by the first machine in Block S154.

For example, the second set of characteristics of the second message can represent: the first source identifier associated with the first sensor; the first digital certificate assigned to the first sensor; a second network path of the second message, the second network path corresponding to the first network path of the first message; a second transmission latency of the first message; and/or a second jitter value representing a difference between a second reception time of the second message and a second expected reception time of the second message; etc.

In response to detecting the third position of the first object falling outside of the first controlled zone and the second controlled zone (and/or detecting absence of any other object intersecting the first controlled zone or the second controlled zone), the system: generates a second command that transitions the first machine from the reduced performance operating mode to the nominal operating mode in Block S160; transmits the second command to the first machine in Block S162; and/or deactivates the warning indicator proximal the third position of the first object in Block S164.

More specifically, the zone controller can execute the foregoing methods and techniques: to generate a message including the second command; and to transmit the message to the first machine (or to a first security module coupled to the first machine). The first machine can transition from the reduced performance operating mode to the nominal operating mode responsive to the second command.

Therefore, the system can: detect absence of the first object from the warning zone and the stop zone associated with the first machine based on a succeeding image generated by the first sensor (and/or an image(s) generated by another sensor(s)); and autonomously trigger the first machine to resume the nominal operating mode in order to reduce disruption to productivity in the operating field.

In one variation, the system executes the foregoing methods: to access a second set of characteristics of the second message in Block S146; to calculate a second trust score of the first object based on the second set of characteristics in Block S148. For example, the second set of characteristics of the second message can represent: the first source identifier associated with the first sensor; the first digital certificate assigned to the first sensor; a second network path of the second message, the second network path different from the first network path of the first message; a second transmission latency of the first message; and/or a second jitter value representing a difference between a second reception time of the second message and a second expected reception time of the second message; etc.

In response to detecting the second trust score falling below the threshold score, the system: defines a third controlled zone (e.g., a second "warning" zone) and a fourth controlled zone (e.g., a second "stop" zone) encompassing the fourth position occupied by the first machine in Block S152; and discards the first controlled zone and the second controlled zone.

In this variation, in response to detecting the third position of the first object falling outside of the third controlled zone and the fourth controlled zone (and/or detecting absence of any other object intersecting the third controlled zone or the fourth controlled zone), the system: generates a second command that transitions the first machine from the reduced performance operating mode to the nominal operating mode in Block S160; transmits the second command to the first machine in Block S162; and/or deactivates the warning indicator proximal the third position of the first object in Block S164.

4.7 Safe State

In another variation, during a first time period, the system executes the foregoing methods and techniques to access a first message including a first frame captured by a first sensor. Based on a first set of features in a first region of the first image, the system executes the foregoing methods and techniques: to detect the first object in the first image; to calculate a first position of the first object, in the reference coordinate system, within the operating field; to access a first set of characteristics of the first message; to calculate a first trust score of the first object based on the first set of characteristics; to access a second position of a first machine in the reference coordinate system; and, in response to detecting the first trust score exceeding a threshold score, to define a first controlled zone (e.g., a "warning" zone) and a second controlled zone (e.g., a "stop" zone) encompassing the second position occupied by the first machine.

For example, the first set of characteristics of the first message can represent: a first source identifier associated with the first sensor; a first digital certificate assigned to the first sensor; a first network path of the first message; a first transmission latency of the first message; and/or a first jitter value representing a difference between a first reception time of the first message and a first expected reception time of the first message; etc.

In this variation, the system executes the foregoing methods and techniques: to detect the first position of the first object intersecting the first controlled zone; to generate a first command that transitions the first machine from a nominal operating mode to a reduced performance operating mode; to transmit the first command to the first machine; and to activate a warning indicator proximal the first position of the first object. The first machine transitions from the nominal operating mode to the reduced performance operating mode responsive to the first command.

In this variation, during a second time period succeeding the first time period, the system executes the foregoing methods and techniques to access a second message including a second image captured by the first sensor in Block S140. Based on a second set of features in a second region of the second image, the system executes the foregoing methods and techniques: to detect the first object in the second image in Block S142; to calculate a third position of the first object, in the reference coordinate system, within the operating field in Block S144; to access a second set of characteristics of the second message in Block S146; to calculate a second trust score of the first object based on the second set of characteristics in Block S148; to access a fourth position of a first machine in the reference coordinate system in Block S150; and, in response to detecting the second trust score exceeding the threshold score, to update (or define) the first controlled zone and the second controlled zone encompassing the fourth position occupied by the first machine in Block S154.

For example, the second set of characteristics of the second message can represent: the first source identifier associated with the first sensor; the first digital certificate assigned to the first sensor; a second network path of the second message, the second network path corresponding to the first network path of the first message; a second transmission latency of the first message; and/or a second jitter value representing a difference between a second reception time of the second message and a second expected reception time of the second message; etc.

In response to detecting the third position of the first object intersecting (or falling within) the second controlled zone, the system executes a second set of actions—associated with the second controlled zone—in Block S132 including: generating a third command that transitions the first machine (e.g., from the reduced performance operating mode, from the nominal operating mode) to the safe state in Block S134; and transmitting the third command to the first machine in Block S136. The first machine transitions to the safe state responsive to the second command.

More specifically, the zone controller can execute the foregoing methods and techniques: to generate a message including the third command; and to transmit the message to the first machine (or to a first security module coupled to the first machine). The first machine can transition to the safe state responsive to the third command.

The system can execute additional actions in the second set of actions associated with the second controlled zone.

In another variation, the system executes the foregoing methods: to access a second set of characteristics of the second message in Block S146; and to calculate a second trust score of the first object based on the second set of characteristics in Block S148. For example, the second set of characteristics of the second message can represent: the first source identifier associated with the first sensor; the first digital certificate assigned to the first sensor; a second network path of the second message, the second network path different from the first network path of the first message; a second transmission latency of the first message; and/or a second jitter value representing a difference between a second reception time of the second message and a second expected reception time of the second message; etc.

In response to detecting the second trust score falling below the threshold score, the system: defines a third controlled zone (e.g., a second "warning" zone) and a fourth controlled zone (e.g., a second "stop" zone) encompassing the fourth position occupied by the first machine in Block S152; and discards the first controlled zone and the second controlled zone.

In this variation, in response to detecting the third position of the first object intersecting (or falling within) the fourth controlled zone, the system executes a fourth set of actions—associated with the fourth controlled zone—in Block S132 including: generating a third command that transitions the first machine (e.g., from the reduced performance operating mode, from the nominal operating mode) to the safe state in Block S134; and transmitting the third command to the first machine in Block S136. The first machine transitions to the safe state responsive to the second command.

5. Controlled Zones by Object Type

In one variation, the system accesses a first policy specifying: a first warning zone—associated with a first object type (e.g., human)—characterized by a first set of dimensions and/or a first set of distances (e.g., a ten foot outer boundary, a five foot inner boundary) from a first machine; a first set of actions associated with the first warning zone; a first stop zone associated with the first object type and characterized by a second set of dimensions and/or a second set of distances (e.g., a five foot outer boundary) from the first machine; and a second set of actions associated with the first stop zone.

In this variation, the system executes the foregoing methods and techniques: to access a position of the first machine in the reference coordinate system; and to define the first warning zone and the first stop zone—associated with the first object type—in the reference coordinate system and encompassing the position occupied by the first machine. The first warning zone can include a first outer boundary including a first point (or points) exhibiting a first distance (e.g., ten feet) from the first machine according to the first policy (e.g., the first set of distances), and the first stop zone can include a second outer boundary including a second point (or points) exhibiting a second distance (e.g., five feet) from the first machine according to the first policy (e.g., the second set of distances).

In this variation, the system executes the foregoing methods and techniques: to access a first message including a first frame captured by a first sensor. Based on a first set of features in a first region of the first image, the system executes the foregoing methods and techniques: to detect a first object—characterized by the first object type—in the first image; to calculate a first position of the first object, in the reference coordinate system, within the operating field; and to calculate a first confidence score associated with the first object type for the first object.

In this variation, the system executes the foregoing methods and techniques: to access a second position of a first machine in the reference coordinate system; and to define a first controlled zone (e.g., a "warning" zone) and a second controlled zone (e.g., a "stop" zone) encompassing the second position occupied by the first machine.

In response to detecting the first position of the first object intersecting (or falling within) the first warning zone associated with the first object type, the system executes the first set of actions associated with the first warning zone, such as: generating a first command that transitions the first machine from a first operating mode (e.g., a nominal operating mode) to a second operating mode (e.g., a reduced performance operating mode); transmitting the first command to the first machine; activating a warning indicator in the operating field proximal the first position of the first object; and/or serving an alert to an operator via an operator interface; etc.

More specifically, the system can execute the first set of actions associated with the first warning zone in response to: detecting the first position of the first object intersecting (or falling within) the first warning zone; and detecting the first confidence score associated with the first object type for the first object exceeding a threshold score (e.g., 80%, 90%).

Accordingly, the system can: detect an object-of-interest—characterized by a target object type—within the first warning zone of the first machine; and command the first machine to operate at a reduced performance operating mode. Therefore, by commanding the first machine to operate at the reduced performance operating mode in response to detecting a confidence score associated with the target object type for the object-of-interest exceeding a threshold score, the system can reduce disruptions to productivity for the first machine, such as due to "false positive" object detections (e.g., the object-of-interest is a light reflection rather than a human worker).

5.1 Multiple Object Types

In another variation, the system executes the foregoing methods and techniques to access a first policy specifying: a first warning zone—associated with a first object type (e.g., human)—characterized by a first set of dimensions and/or a first set of distances (e.g., a ten foot outer boundary, a five foot inner boundary) from a first machine; a first set of actions associated with the first warning zone; a first stop zone associated with the first object type and characterized by a second set of dimensions and/or a second set of distances (e.g., a five meter outer boundary) from the first machine; and a second set of actions associated with the first stop zone.

In this variation, the system accesses a second policy specifying: a second warning zone—associated with a second object type (e.g., pallet)—characterized by a third set of dimensions and/or a third set of distances (e.g., six foot outer boundary, two foot inner boundary) from the first machine; a third set of actions associated with the second warning zone; a second stop zone associated with the second object type and characterized by a fourth set of dimensions and/or a fourth set of distances (e.g., two foot outer boundary) from the first machine; and a fourth set of actions associated with the second stop zone.

In this variation, the system executes the foregoing methods and techniques: to access a position of the first machine in the reference coordinate system; and to define the first warning zone and the first stop zone—associated with the first object type—in the reference coordinate system and encompassing the position occupied by the first machine. The first warning zone can include a first outer boundary including a first point (or points) exhibiting a first distance (e.g., ten feet) from the first machine according to the first policy (e.g., the first set of distances), and the first stop zone can include a second outer boundary including a second point (or points) exhibiting a second distance (e.g., five feet) from the first machine according to the first policy (e.g., the second set of distances).

Additionally, the system can execute the foregoing methods and techniques to define the second warning zone and the second stop zone—associated with the second object type—in the reference coordinate system and encompassing the position occupied by the first machine within the reference coordinate system. The second warning zone can include a third outer boundary exhibiting a third distance (e.g., six feet) from the first machine according to the second policy (e.g., the third set of distances), and the second stop zone can include a fourth outer boundary exhibiting a fourth distance (e.g., two feet) from the first machine according to the second policy (e.g., the fourth set of distances).

In this variation, the system executes the foregoing methods and techniques to access a first message including a first frame captured by a first sensor. Based on a first set of features in a first region of the first image, the system executes the foregoing methods and techniques: to detect a first object—characterized by the first object type—in the first image; to calculate a first position of the first object, in the reference coordinate system, within the operating field; and to calculate a first confidence score associated with the first object type for the first object.

In this variation, the system executes the foregoing methods and techniques: to access a second position of a first machine in the reference coordinate system; and to define a first warning zone and a first stop zone encompassing the second position occupied by the first machine.

Additionally, based on a second set of features in a second region of the first image, the system can execute the foregoing methods and techniques: to detect a second object—characterized by the second object type—in the first image; to calculate a third position of the second object, in the reference coordinate system, within the operating field; and to calculate a second confidence score associated with the second object type for the second object.

In this variation, the system can execute the foregoing methods and techniques to define a second warning zone and a second stop zone encompassing the second position occupied by the first machine.

In this variation, the system: detects the first position of the first object intersecting (or falling within) the first warning zone associated with the first object type; detects the third position of the second object falling outside of the second warning zone and the second stop zone; and executes the first set of actions associated with the first warning zone.

For example, in response to detecting the first position of the first object intersecting (or falling within) the first warning zone associated with the first object type and in response to detecting the third position of the second object falling outside of the second warning zone and the second stop zone, the system can execute the foregoing methods and techniques: to generate a first command that transitions the first machine from a first operating mode (e.g., a nominal operating mode) to a second operating mode (e.g., a reduced performance operating mode); to transmit the first command to the first machine; to activate a warning indicator in the operating field proximal the first object and/or the first sensor; and/or to serve an alert to an operator via an operator interface; etc.

In another variation, the system: detects the first position of the first object intersecting (or falling within) the first warning zone associated with the first object type; detects the third position of the second object intersecting (or falling within) the second stop zone; and executes the fourth set of actions associated with the second stop zone.

For example, in response to detecting the first position of the first object intersecting (or falling within) the first warning zone associated with the first object type and in response to detecting the third position of the second object intersecting (or falling within) the second stop zone, the system can execute the foregoing methods and techniques: to generate a second command that transitions the first machine (e.g., from a nominal operating mode, from a reduced performance operating mode) to a safe state; to transmit the second command to the first machine; to activate a warning indicator in the operating field proximal the first object and/or the first sensor; and/or to serve an alert to an operator via an operator interface; etc.

Accordingly, the system can: detect a first object-of-interest characterized by a first object type within a warning zone associated with the first object type for a machine; detect a second object-of-interest characterized by a second object type within a stop zone associated with the second object type for the machine; and execute a set of actions associated with the stop zone in order to prioritize a safety response for detection of the second object-of-interest within the stop zone. Therefore, rather than commanding the machine to transition to a reduced performance operating mode in response to detecting the first object-of-interest in the warning zone, the system can command the machine to transition to a safe state in response to detecting the second object-of-interest in the stop zone in order to reduce risk of a safety incident in the operating field.

6. False Positives

In one variation, the system executes the foregoing methods and techniques: to access a message including an image captured by a sensor defining a field of view intersecting an operating field; to correlate a set of features (e.g., a cluster of pixels) in the image with an object characterized by an object type, such as a liquid spill; to calculate a first position of the object, in the reference coordinate system, within the operating field based on the first set of features; and to define a warning zone, in the reference coordinate system, encompassing a second position of a machine; and to detect the first position of the first object intersecting (or falling within) the warning zone.

In response to detecting the first position of the first object intersecting the warning zone, the system executes a set of actions associated with the warning zone, the set of actions including: generating a message including the image; and transmitting the message to an operator—such as via an operator interface—for confirmation of the set of features in the image as corresponding to the object characterized by the object type.

In this variation, the system receives feedback from the operator (e.g., via the operator interface) rejecting the set of features as corresponding to an object characterized by the first object type.

For example, the system can receive feedback from the operator indicating (or labeling) the set of features (or the object) as a light reflection rather than a liquid spill.

In response to receiving feedback from the operator rejecting the set of features as corresponding to an object characterized by the first object type, the system: discards (or ignores) the object; generates a second command that transitions the first machine from the reduced performance operating mode to the nominal operating mode in Block S160; and transmits the second command to the first machine in Block S162.

Therefore, the system can reduce occurrence of "false positives," thereby reducing downtime of machines during operation.

Additionally, the system can re-train (e.g., fine-tune) the object detection model based on feedback from the operator (e.g., the first cluster of pixels labeled as a light reflection).

7. Conclusion

The systems and methods described herein can be embodied and/or implemented at least in part as a machine configured to receive a computer-readable medium storing computer-readable instructions. The instructions can be executed by computer-executable components integrated with the application, applet, host, server, network, website, communication service, communication interface, hardware/firmware/software elements of a user computer or mobile device, wristband, smartphone, or any suitable combination thereof. Other systems and methods of the embodiment can be embodied and/or implemented at least in part as a machine configured to receive a computer-readable medium storing computer-readable instructions. The instructions can be executed by computer-executable components integrated with apparatuses and networks of the type described above. The computer-readable medium can be stored on any suitable computer readable media such as RAMs, ROMs, flash memory, EEPROMs, optical devices (CD or DVD), hard drives, floppy drives, or any suitable device. The computer-executable component can be a processor, but any suitable dedicated hardware device can (alternatively or additionally) execute the instructions.

As a person skilled in the art will recognize from the previous detailed description and from the figures and claims, modifications and changes can be made to the embodiments of the invention without departing from the scope of this invention as defined in the following claims.

I claim:

1. A method comprising, during a first time period:

accessing a first message comprising a first image captured by a first fixed optical sensor defining a field of view intersecting an operating field;

based on a first set of features in a first region of the first image:

detecting a first object in the first image; and calculating a first position of the first object, in a reference coordinate system, within the operating field;

accessing a first set of characteristics of the first message, the first set of characteristics representing:

a first source identifier associated with the first fixed optical sensor; and a first digital certificate assigned to the first fixed optical sensor;

calculating a first trust score for the first object based on the first set of characteristics;

accessing a second position of a first machine in the reference coordinate system;

in response to the first trust score exceeding a first threshold score, defining a first boundary of a first controlled zone, in the reference coordinate system, encompassing the second position occupied by the first machine; and in response to detecting the first position of the first object intersecting the first controlled zone, executing a first set of actions comprising:

generating a first command that transitions the first machine from a nominal operating mode to a reduced performance operating mode; and transmitting the first command to the first machine.

2. The method of claim 1:

wherein defining the first boundary comprises defining the first boundary exhibiting a first distance from the second position occupied by the first machine;

further comprising, in response to the first trust score exceeding the first threshold score, defining a second boundary of a second controlled zone, in the reference coordinate system, encompassing the second position occupied by the first machine, the second boundary exhibiting a second distance from the second position occupied by the first machine, the second distance falling below the first distance; and wherein generating the first command comprises generating the first command that transitions the first machine from the nominal operating mode to the reduced performance operating mode in response to detecting the first position of the first object intersecting the first controlled zone and falling outside of the second controlled zone.

3. The method of claim 2, further comprising, during a second time period succeeding the first time period:

accessing a second message comprising a second image captured by the first fixed optical sensor;

based on a second set of features in a second region of the second image:

detecting the first object in the second image; and calculating a third position of the first object, in the reference coordinate system, within the operating field;

accessing a second set of characteristics of the second message, the second set of characteristics representing:

the first source identifier associated with the first fixed optical sensor;

the first digital certificate assigned to the first fixed optical sensor; and a jitter value representing a difference between a reception time of the second message and an expected reception time of the second message;

calculating a second trust score for the first object based on the second set of characteristics;

accessing a fourth position of the first machine in the reference coordinate system;

in response to detecting the second trust score exceeding the first trust score threshold, updating the first controlled zone and the second controlled zone in the reference coordinate system based on the fourth position occupied by the first machine; and in response to detecting the third position of the first object intersecting the second controlled zone, executing a second set of actions comprising:

generating a second command that transitions the machine from the reduced performance operating mode to a safe state; and transmitting the second command to the first machine.

4. The method of claim 1, further comprising, during a second time period succeeding the first time period:

accessing a second message comprising a second image captured by the first fixed optical sensor;

based on a second set of features in a second region of the second image:

detecting the first object in the second image; and calculating a third position of the first object, in the reference coordinate system, within the operating field;

accessing a second set of characteristics of the second message, the second set of characteristics representing:

the first source identifier associated with the first fixed optical sensor;

the first digital certificate assigned to the first fixed optical sensor; and a transmission latency of the second message;

calculating a second trust score for the first object based on the second set of characteristics:

accessing a fourth position of the first machine in the reference coordinate system;

in response to detecting the second trust score exceeding the first trust score threshold, updating the first controlled zone in the reference coordinate system based on the fourth position occupied by the first machine; and in response to detecting the fourth position of the first object falling outside of the first controlled zone, executing a second set of actions comprising:

generating a second command that transitions the machine from the reduced performance operating mode to the nominal operating mode; and transmitting the second command to the first machine.

5. The method of claim 1:

wherein detecting the first object in the first image comprises detecting the first object in the first image based on the first set of features, the first object characterized by a first object type;

wherein defining the first boundary of the first controlled zone comprises defining the first boundary, of the first controlled zone associated with the first object type, comprising a first point exhibiting a first distance from the second position occupied by the first machine;

further comprising:

based on a second set of features in a second region of the first image:

detecting a second object in the first image, the second object characterized by a second object type; and calculating a third position of the second object, in the reference coordinate system, within the operating field; and defining a second boundary of a second controlled zone, associated with the second object type, in the reference coordinate system encompassing the second position occupied by the first machine, the second boundary comprising a second point exhibiting a second distance from the second position occupied by the first machine, the second distance falling below the first distance; and wherein generating the first command comprises generating the first command in response to:

detecting the first position of the first object intersecting the first controlled zone; and detecting the third position of the second object falling outside of the second controlled zone.

6. The method of claim 1:

further comprising, during the first time period:

accessing a second message comprising a second image captured by a second fixed optical sensor defining a second field of view intersecting the operating field; and based on a second set of features in a second region of the second image, detecting the first object in the second image;

wherein calculating the first position of the first object comprises, based on the first set of features and the second set of features, calculating the first position of the first object, in the reference coordinate system, within the operating field;

further comprising accessing a second set of characteristics of the second message, the second set of characteristics representing:

a second source identifier associated with the second fixed optical sensor; and a second digital certificate assigned to the second fixed optical sensor; and wherein calculating the first trust score for the first object comprises calculating the first trust score for the first object based on the first set of characteristics and the second set of characteristics.

7. The method of claim 1, wherein calculating the first trust score for the first object comprises:

accessing the first certificate defining a first validity period;

at a first time in the first time period, detecting the first time falling within the first validity period;

in response to detecting the first time falling within the first validity period, calculating a first trust sub-score for the first message;

in response to detecting presence of the first source identifier in a communication authorization list, calculating a second trust sub-score for the first message; and calculating the first trust score for the first object based on a combination of the first trust sub-score and the second trust sub-score.

8. The method of claim 1:

wherein detecting the first object comprises:

based on the first set of features in the first region of the first image, detecting the first object characterized by a first object type; and calculating a first confidence score associated with the first object type for the first object; and wherein executing the first set of actions comprises executing the first set of actions associated with the first object type in response to the first confidence score associated with the first object type for the first object exceeding a threshold score.

9. The method of claim 1, further comprising, during the first time period:

accessing a third position of a second machine in the reference coordinate system;

in response to detecting the first trust score exceeding the first threshold score, defining second boundary of a second controlled zone, in the reference coordinate system, encompassing the third position occupied by the second machine; and in response to detecting the first position of the first object intersecting the second controlled zone, executing a second set of actions comprising:

generating a second command that transitions the second machine from the nominal operating mode to a safe state; and transmitting the second command to the second machine.

10. The method of claim 1:

wherein accessing the second position of the first machine in the reference coordinate system comprises, based on a second set of features in a second region of the first image:

detecting the first machine in the first image;

calculating the second position of the first machine, in the reference coordinate system, within the operating field; and calculating a second trust score for the first machine based on the first set of characteristics; and wherein defining the first boundary of the first controlled zone comprises defining the first boundary of the first controlled zone, in the reference coordinate system, encompassing the second position occupied by the first machine in response to:

the first trust score exceeding the first threshold score; and the second trust score exceeding a second threshold score.

11. The method of claim 1:

wherein accessing the second position of the first machine in the reference coordinate system comprises:

receiving a second message, indicating the second position of the first machine in the reference coordinate system, from a first security module associated with the first machine;

accessing a second set of characteristics of the second message, the second set of characteristics representing a second certificate assigned to the first security module; and calculating a second trust score for the first machine based on the second set of characteristics; and wherein defining the first boundary of the first controlled zone comprises defining the first boundary of the first controlled zone, in the reference coordinate system, encompassing the second position occupied by the first machine in response to:

the first trust score exceeding the first threshold score; and the second trust score exceeding a second threshold score.

12. The method of claim 1:

wherein detecting the first object in the first image comprises, based on the first set of features in the first region of the first image, detecting the first object characterized by a first object type;

wherein executing the first set of actions comprises executing the first set of actions comprising:

generating a first message comprising the first image; and transmitting the first message to an operator via an operator interface; and further comprising, in response to receiving feedback from the operator rejecting the first set of features as corresponding to an object characterized by the first object type:

generating a second command that transitions the first machine from the reduced performance operating mode to the nominal operating mode; and transmitting the second command to the first machine.

13. The method of claim 1:

wherein generating the first command comprises generating a message comprising:

a first bit pattern representing the first command; and a second bit pattern representing the first command, the second bit pattern exhibiting a hamming distance exceeding a threshold hamming distance from the first bit pattern; and wherein transmitting the first command comprises transmitting the message to a security module coupled to the first machine.

14. The method of claim 1, wherein executing the first set of actions comprises executing the first set of actions comprising:

activating a warning indicator in the operating field proximal the first position of the first object; and serving an alert to an operator via an operator interface.

15. The method of claim 14, wherein serving the alert comprises:

generating a virtual map of the operating field representing:

the first position of the first object in the reference coordinate system representing the operating field;

the second position of the first machine in the reference coordinate system; and a third position of the first fixed optical sensor in the reference coordinate system;

populating the virtual map with a representation of the first controlled zone;

labeling the representation of the first controlled zone with the alert indicating detection of the first object intersecting the first controlled zone; and serving the virtual map to the operator via the operator interface.

16. A method comprising, during a first time period:

accessing a first message comprising a first image captured by a fixed optical sensor defining a field of view intersecting an operating field;

based on a first set of features in a first region of the first image:

detecting a first object in the first image; and calculating a first position of the first object, in a reference coordinate system, within the operating field;

accessing a first set of characteristics of the first message, the first set of characteristics representing a first network path of the first message; and a first jitter value representing a first difference between a first reception time of the first message and a first expected reception time of the first message;

calculating a first trust score for the first object based on the first set of characteristics;

accessing a second position of a first machine in the reference coordinate system;

in response to detecting the first trust score exceeding a threshold score, accessing a first policy for the first machine, the first policy specifying:

a first controlled zone comprising a first boundary exhibiting a first distance from the first machine;

a first set of actions associated with the first controlled zone;

a second controlled zone comprising a second boundary exhibiting a second distance from the first machine, the second distance falling below the first distance; and a second set of actions associated with the second controlled zone;

defining the first controlled zone and the second controlled zone, in the reference coordinate system, encompassing the second position occupied by the first machine;

in response to detecting the first position of the first object intersecting the first controlled zone, executing the first set of actions comprising:

generating a first command that transitions the first machine from a nominal operating mode to a reduced performance operating mode;

transmitting the first command to the first machine; and activating a warning indicator in the operating field proximal the first position of the first object; and in response to detecting the first position of the first object falling outside of the second controlled zone, bypassing the second set of actions comprising generating a second command that transitions the first machine to a safe state.

17. The method of claim 16, further comprising, during a second time period succeeding the first time period:

accessing a second message comprising a second image captured by the fixed optical sensor;

based on a second set of features in a second region of the second image:

detecting the first object in the second image; and calculating a third position of the first object, in the reference coordinate system, within the operating field;

accessing a second set of characteristics of the second message, the second set of characteristics representing:

a second network path of the second message, the second network path different from the first network path; and a second jitter value representing a second difference between a second reception time of the second message and a second expected reception time of the second message;

calculating a second trust score for the first object based on the second set of characteristics;

accessing a fourth position of the first machine in the reference coordinate system;

in response to detecting the second trust score falling below the threshold score, accessing a second policy for the first machine, the second policy specifying:

a third controlled zone comprising a third boundary exhibiting a third distance from the first machine, the third distance exceeding the first distance;

a third set of actions associated with the third controlled zone;

a fourth controlled zone comprising a fourth boundary exhibiting a fourth distance from the first machine, the fourth distance exceeding the second distance and falling below the third distance; and a fourth set of actions associated with the fourth controlled zone;

discarding the first controlled zone and the second controlled zone in the reference coordinate system;

defining the third controlled zone and the fourth controlled zone, in the reference coordinate system, encompassing the fourth position of the first machine; and in response to detecting the third position of the first object intersecting the second controlled zone, executing the fourth set of actions comprising:

generating the second command that transitions the first machine to the safe state; and transmitting the second command to the first machine.

18. The method of claim 16, further comprising, during a second time period succeeding the first time period:

accessing a second message comprising a second image captured by the fixed optical sensor;

based on a second set of features in a second region of the second image:

detecting the first object in the second image; and calculating a third position of the first object, in the reference coordinate system, within the operating field;

accessing a second set of characteristics of the second message, the second set of characteristics representing;

a second network path of the first message, the second network path corresponding to the first network path; and a second jitter value representing a second difference between a second reception time of the second message and a second expected reception time of the second message;

calculating a second trust score for the first object based on the second set of characteristics;

accessing a fourth position of the first machine in the reference coordinate system;

in response to detecting the second trust score exceeding the threshold score, updating the first controlled zone and the second controlled zone in the reference coordinate system based on the fourth position occupied by the first machine; and in response to detecting the third position of the first object falling outside of the first controlled zone and the second controlled zone:

generating a third command that transitions the first machine to the nominal operating mode;

transmitting the third command to the first machine; and deactivating the warning indicator in the operating field.

19. The method of claim 16:

wherein accessing the first set of characteristics comprises accessing the first set of characteristics representing the first network path comprising a first set of nodes; and wherein calculating the first trust score for the first object comprises:

in response to detecting presence of a first set of identifiers of the first set of nodes in an authorized list of identifiers, calculating a first trust sub-score for the first message;

in response to detecting the first jitter value falling below a threshold jitter value, calculating a second trust sub-score for the first message; and calculating the first trust score based on a combination of the first trust sub-score and the second trust sub-score.

20. A method comprising:

accessing a message comprising an image captured by a fixed optical sensor defining a field of view intersecting an operating field;

based on a set of features in a first region of the image:

detecting an object in the image; and calculating a first position of the object, in a reference coordinate system, within the operating field;

accessing a set of characteristics of the message, the set of characteristics representing:

a digital certificate assigned to the fixed optical sensor; and a network path of the message;

calculating a trust score for the object based on the set of characteristics;

accessing a second position of a machine in the reference coordinate system;

in response to the trust score exceeding a threshold score, defining a controlled zone, in the reference coordinate system, encompassing the second position occupied by the machine;

in response to detecting the first position of the object intersecting the controlled zone, generating a command that transitions the machine from a first operating mode to a second operating mode; and transmitting the command to the machine.

* * * * *